(12) United States Patent
Scheer et al.

(10) Patent No.: US 8,407,265 B1
(45) Date of Patent: Mar. 26, 2013

(54) HIERARCHICAL MAPPING OF FREE BLOCKS OF CYLINDER GROUPS OF FILE SYSTEMS BUILT ON SLICES OF STORAGE AND LINKING OF THE FREE BLOCKS

(75) Inventors: Michael D. Scheer, Summit, NJ (US); Jean-Pierre Bono, Westboro, MA (US); Morgan Clark, South Orange, NJ (US); Hongliang Tang, Shrewsbury, MA (US); Sairam Veeraswamy, South Grafton, MA (US); Pranit Sethi, Somerset, NJ (US); Alexander S. Mathews, Jamesburg, NJ (US)

(73) Assignee: EMC Corporation, Hopkinton, MA (US)

( * ) Notice: Subject to any disclaimer, the term of this patent is extended or adjusted under 35 U.S.C. 154(b) by 251 days.

(21) Appl. No.: 12/950,996

(22) Filed: Nov. 19, 2010

(51) Int. Cl.
*G06F 12/00* (2006.01)

(52) U.S. Cl. ........ 707/823; 711/170; 711/111; 711/112; 711/114

(58) Field of Classification Search .................. 707/823; 711/170, 111, 112, 114
See application file for complete search history.

(56) References Cited

U.S. PATENT DOCUMENTS

| | | | |
|---|---|---|---|
| 5,893,140 A | 4/1999 | Vahalia et al. | |
| 5,933,603 A | 8/1999 | Vahalia et al. | |
| 6,173,293 B1 | 1/2001 | Thekkath et al. | |
| 6,687,787 B1 | 2/2004 | Richardson et al. | |
| 6,697,846 B1 | 2/2004 | Soltis | |
| 7,631,155 B1 | 12/2009 | Bono et al. | |
| 7,818,535 B1 * | 10/2010 | Bono et al. | 711/173 |
| 7,822,927 B1 | 10/2010 | Scheer | |
| 7,865,485 B2 | 1/2011 | Mullick et al. | |
| 7,873,619 B1 * | 1/2011 | Faibish et al. | 707/705 |
| 7,930,476 B1 | 4/2011 | Castelli et al. | |
| 7,945,726 B2 | 5/2011 | Faibish et al. | |
| 8,032,498 B1 | 10/2011 | Armangau et al. | |
| 8,032,701 B1 | 10/2011 | Glade et al. | |
| 8,037,345 B1 * | 10/2011 | Iyer et al. | 714/6.12 |
| 8,046,561 B1 | 10/2011 | Todd et al. | |

OTHER PUBLICATIONS

Vahalia, Uresh, Unix Internals: The New Frontiers, 1996, p. 261-290, Prentice-Hall, Inc., Upper Saddle River, NJ.

* cited by examiner

*Primary Examiner* — Hong Kim
(74) *Attorney, Agent, or Firm* — Richard Auchterlonie; Novak Druce Connolly Bove + Quigg LLP

(57) ABSTRACT

In a file server, a file system is built upon a volume of data storage. The file system includes multiple cylinder groups. Each cylinder group includes file system blocks. The file system blocks include allocated blocks and free blocks. The volume includes slices of storage, and each slice stores at least one of the cylinder groups. A hierarchical slice map has a top level that includes a count of free blocks in the file system, an upper level that includes a count of free blocks in groups of the slices, an intermediate level that includes a count of the free blocks in sub-groups of the slices, and a bottom level that includes a count of the free blocks in each slice of storage. To find a free block for allocation to a file, the slice map hierarchy is searched in a top-down fashion.

20 Claims, 16 Drawing Sheets

HIERARCHICAL MAPPING OF FREE BLOCKS OF CYLINDER GROUPS OF FILE SYSTEMS BUILT ON SLICES OF STORAGE AND LINKING OF THE FREE BLOCKS

FIELD OF THE INVENTION

The present invention relates generally to file servers, and more particularly to allocation of data storage to files in a file system. The present invention relates specifically to locating blocks of storage that have been allocated to a file system and are free to be allocated to a file in the file system.

BACKGROUND OF THE INVENTION

A file server provides one or more clients with access to files of a file system in data storage. A popular kind of file system is a UNIX-based file system as described in Uresh Vahalia, *Unix Internals—The New Frontiers*, Chapter 9, File System Implementations, pp. 261-290, Prentice-Hall, Inc., Upper Saddle River, N.J. (1996). A file in a Unix-based file system is a hierarchy of file system blocks. The file system block at the top or root of the hierarchy is called an "inode." The inode contains attributes of the file, such as the file type, the size of the file, user and group IDs of the owner of the file, timestamps, and permissions and mode flags. The inode also contains a block pointer array including pointers to one or more file system blocks that are directly below the inode in the hierarchy. The data of the file is contained in one or more file system blocks at the bottom or leaves of the hierarchy. If the file contains more than ten data blocks, then there will be at least one indirect block directly below inode in the hierarchy.

The fact that the file contains pointers to the data blocks in the file permits any free block of the file system to be allocated to a file of the file system and mapped to any logical block of the logical extent of the file. The additional flexibility of file system block allocation permits more efficient storage utilization by reducing storage fragmentation and permitting sparse files and efficient dynamic extension of files.

When files are created or extended, or holes are filled in sparse files, there is a need to locate blocks of free storage available for allocation to the file. Typically this storage resource location process involves searching for free physical storage blocks that have already been allocated to the file system. For example, physical storage typically is allocated to the file system in multiples of a unit called a "cylinder group." Each cylinder group includes a cylinder group header followed by multiple file system blocks. For example, the file system block size is 8 kilobytes, the cylinder group size is 64 megabytes, and the cylinder group header occupies one 8 kilobyte block.

The cylinder group header includes a data structure describing summary information about that cylinder group. This summary information includes a free inode list and a free block list. When a new file is created, the free inode list is searched to find a free inode to be allocated to the new file. When an indirect block or a data block is needed for a new file or for extending an existing file, then the free block list is searched to find a free block to be allocated to the file.

Recently there has been a need to decrease the burden and cost of storage management and administration. The number and size of file systems to be managed have been increasing due to a continuing increase in processing power and decrease in storage cost. Thin provisioning by the use of virtual storage is an increasingly popular way of dealing with the increase in the number and size of file systems. Virtual storage provides a way of dynamically provisioning a file system with physical storage as a file system grows. A file system can be built upon a very large sparse metavolume provisioned with a small amount of physical storage. In this case, the blocks of virtual storage in the sparse metavolume include some blocks that are provisioned with physical storage, and other blocks that are not provisioned with physical storage. By building a file system upon a sparse metavolume, the system administrator is relieved of the burden of frequently reconfiguring the file system as the number of allocated blocks in the file system reaches the size of the logical volume upon which the file system is built.

SUMMARY OF THE INVENTION

There is a performance penalty associated with building a file system upon a sparse metavolume. The performance penalty arises when a free block of storage is allocated to a file in the file system. In this case, the free block should be a block of the sparse metavolume that is provisioned with physical storage. Therefore, some additional time is required to ensure that the search for a free block of storage is directed to blocks of the sparse metavolume that are provisioned with physical storage. In order to offset the performance penalty associated with searching for a free block of storage in a file system built on a sparse metavolume, it is desired to reduce the time required to perform the search for a free block of storage when a free block of storage is allocated to a file in a file system.

It has been discovered that the search time can be reduced by maintaining a hierarchical map of the free blocks of data storage in the file system, and searching this hierarchical map in a top-down fashion to find a free block of storage to be allocated to a file in the file system. Moreover, the hierarchical map can be used to reduce the search time for a file system that is built on a logical volume that is not sparse. The hierarchical map may also provide a more efficient search capability when searching for chunks of contiguous blocks and blocks configured from a particular type of physical storage.

In accordance with one aspect, the invention provides a computer-implemented method of operating a file server. The file server includes data storage and a data processor. The data storage stores a logical volume and a file system built on the logical volume. The file system includes multiple cylinder groups. Each of the cylinder groups includes file system blocks. The file system blocks include allocated blocks and free blocks of the data storage. The logical volume includes slices of the data storage. Each slice of the data storage stores one or more of the cylinder groups. The method includes the data processor executing computer instructions stored on a non-transitory computer-readable storage medium to perform the steps of: (a) maintaining, in the file server, a hierarchical map of the free blocks of the data storage in the file system; (b) searching the hierarchical map in a top-down fashion to find a cylinder group of the file system including a free block of the data storage in the file system; and (c) linking the free block of the data storage from the cylinder group found in step (b) to a file. The hierarchical map has an upper level including a summary of free blocks of the data storage in groups of the slices. The hierarchical map has at least one intermediate level including a summary of free blocks of the data storage in sub-groups of the slices. The hierarchical map has a bottom level including a summary of free blocks of the data storage in each of the slices of the data storage.

In accordance with another aspect, the invention provides a file server. The file server includes data storage storing a logical volume and a file system built on the logical volume.

The file system includes multiple cylinder groups. Each of the cylinder groups includes file system blocks. The file system blocks include allocated blocks and free blocks of the data storage. The logical volume includes slices of the data storage. Each slice of the data storage stores one or more of the cylinder groups. The file server further includes a data processor coupled to the data storage for storing data in the data storage and for reading stored data from the data storage. The file server further includes a non-transitory computer readable storage medium storing computer instructions that, when executed by the data processor, perform the steps of: (a) maintaining, in the file server, a hierarchical map of the free blocks of the data storage in the file system; (b) searching the hierarchical map in a top-down fashion to find a cylinder group of the file system including a free block of the data storage in the file system; and (c) linking the free block of the data storage from the cylinder group found in step (b) to a file. The hierarchical map has an upper level including a summary of free blocks of the data storage in groups of the slices. The hierarchical map has at least one intermediate level including a summary of free blocks of the data storage in sub-groups of the slices. The hierarchical map has a bottom level including a summary of free blocks of the data storage in each of the slices of the data storage.

In accordance with a final aspect, the invention provides a non-transitory computer-readable storage medium containing instructions that, when executed by a data processor of a file server, perform the steps of: (a) maintaining, in the file server, a hierarchical map of free blocks of data storage in a file system built upon a volume of slices of the data storage; (b) searching the hierarchical map in a top-down fashion to find a cylinder group of the file system including a free block of the data storage in the file system; and (c) linking the free block of the data storage from the cylinder group found in step (b) to a file. Each of the slices of the data storage contains one or more cylinder groups of the file system. The hierarchical map has an upper level including a summary of the free blocks of the data storage in groups of the slices. The hierarchical map has at least one intermediate level including a summary of the free blocks in sub-groups of the slices. The hierarchical map has a bottom level including a summary of the free blocks of the data storage in each of the slices of the data storage.

BRIEF DESCRIPTION OF THE DRAWINGS

Additional features and advantages of the invention will be described below with reference to the drawings, in which.

Figure 1:
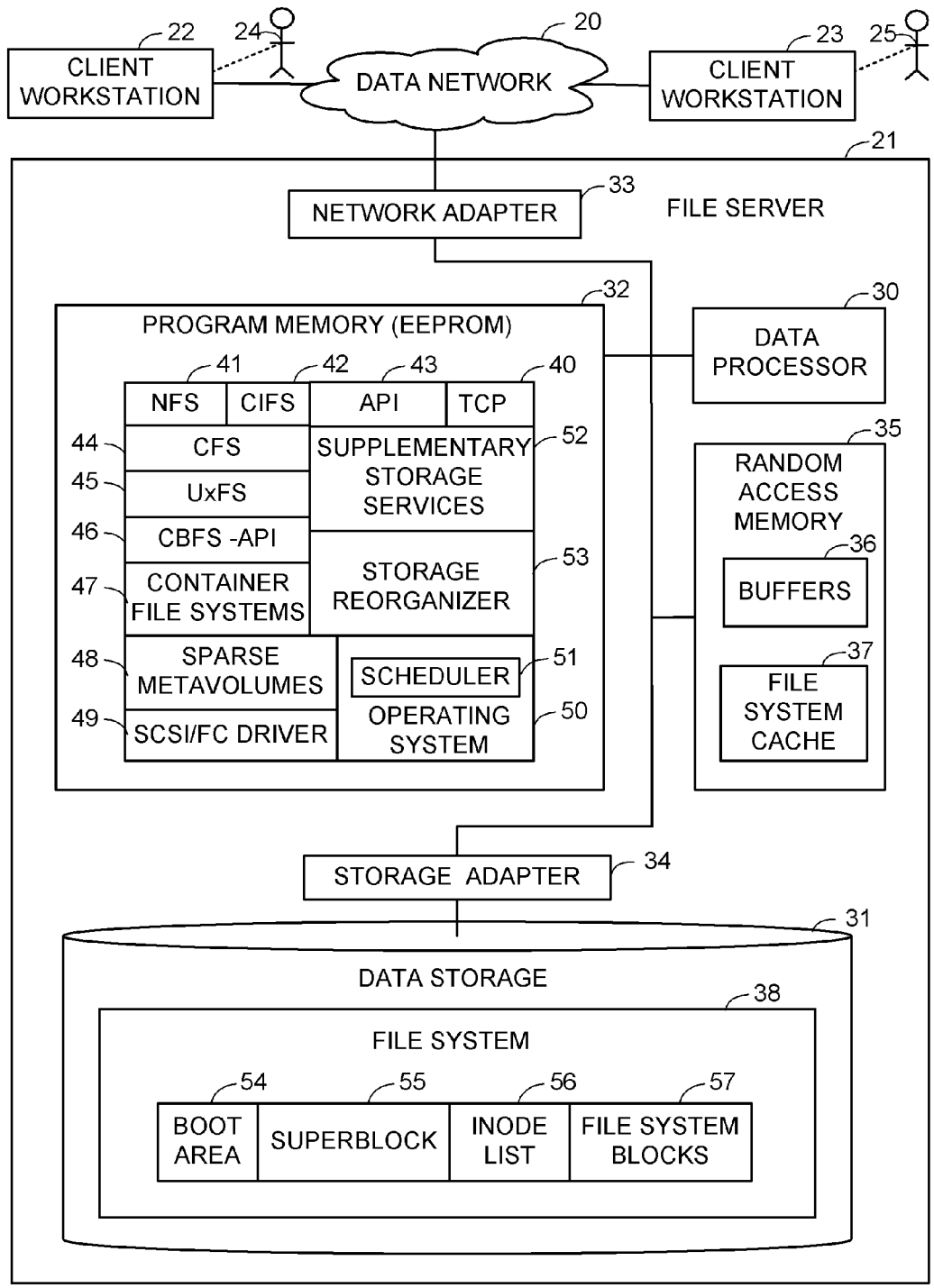
FIG. 1 is a block diagram of a data processing system including a network file server.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data network 20 including a file server 21 servicing client workstations 22, 23 operated by human users 24, 25. The file server includes a network adapter 33 linking the file server 21 to the data network 20, and a data processor 30 coupled to the network adapter 33 and programmed for responding to client requests for access to files in data storage 31. The data processor 30 is a general purpose digital computer data processor including one or more central processing units (CPUs) for executing computer program instructions stored in a program memory 32.

The program memory 32 is a non-transitory computer readable storage medium, such as electrically erasable and programmable read-only memory (EEPROM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks.

The program memory 32 stores an operating system program 50 and various other programs executed under control of the operating system program. The operating system 50 includes a task scheduler 51 for scheduling tasks of different priority. The task scheduler 51 may schedule real-time (RT) tasks and also general purpose (GP) tasks programmed as code threads. The task scheduler 51, for example, maintains application timers, and schedules execution and context switching between real-time (RT) and general purpose (GP)

code threads. A suitable task scheduler is shown and described in FIG. 5 and columns 11 to 13 of Vahalia et al. U.S. Pat. No. 5,933,603 issued Aug. 3, 1999, incorporated herein by reference.

The other programs executed under control of the operating system 50 include a Transmission Control Protocol (TCP) module 40, a Network File System (NFS) module 41, a Common Internet File System (CIFS) module 42, and an application program interface (API) module 43. The Transmission Control Protocol (TCP) module 40 enables the NFS module 41, the CIFS module 42, and the API module 43 to communicate with the client workstations 22, 23 over the data network 20 using the Transmission Control Protocol. The TCP module maintains buffers 36 in random access memory 35 for buffering data received from or transmitted to the client workstations 22, 23.

The NFS module 41 recognizes file access commands received from the client workstations 22, 23 in accordance with the Network File System (NFS) protocol. The CIFS module 42 recognizes file access commands received from the client workstations 22, 23 in accordance with the Common Internet File System (CIFS) protocol. For example, network clients such as UNIX (Trademark) workstations may use the NFS protocol to access files in the data storage 31, and network clients such as Microsoft Windows (Trademark) workstations may use the CIFS protocol to access files in the data storage 31.

The application program interface (API) module 43 recognizes additional file access commands which may extend the functionality of the NFS and CIFS protocols. For example, if the NFS module 41 or the CIFS module 42 receives a file access request including an operation code that is not in accordance with the NFS or CIFS protocol, then the NFS module 41 or the CIFS module 42 will invoke the API module 43 in an attempt to execute the operation or function. The API module 43 may also respond to remote procedure calls from network clients in accordance with other network protocols, such as the Simple Network Management Protocol (SNMP) or the Hypertext Transfer Protocol (HTTP).

The NFS module 41 and the CIFS module 42 are layered over a Common File System (CFS) module 44, and the CFS module is layered over a Universal File System (UxFS) module 45. The UxFS module 45 supports a UNIX-based file system, and maintains a file system cache 37 in random access memory 35 as further described in Vahalia et al. U.S. Pat. No. 5,893,140 issued Apr. 6, 1999, entitled "File Server Having a File System Cache and Protocol for Truly Safe Asynchronous Writes," incorporated herein by reference. A container file systems layer 47 provides access to the container file systems, and a sparse metavolumes layer 48 provides access to the sparse metavolumes.

A common block file system (CBFS) application interface (API) 46 provides an application interface to the container file systems layer 47 and the sparse metavolumes layer 48 by translating from asynchronous to synchronous operation and implementing exchange semantics. The common block file system application interface 46 also provides utility programs for various features of the container file systems and the sparse metavolumes in order to reduce the total cost of ownership of the file server and enhance data availability and storage scalability. These features include use of a storage reorganizer 53 for improved thin provisioning and enhanced data mobility between levels of tiered storage, more flexible redundant data elimination, improved fault detection and finer granularity of fault containment, and seamless integration of common supplementary storage services 52 for iSCSI LUNs and user file systems, such as services for backup, recovery, and information lifecycle management (ILM).

For example, the common supplementary storage services 52 use the NFS module 41 for access to the container file systems in a conventional fashion, and call common block file system application program interface routines 46 for access to unconventional features of the container file systems and for control and access to metadata of the sparse metavolumes 48. Further details of the common block file system application program interface routines 46, the container file systems 47, the sparse metavolumes 48, the storage reorganizer 53, and the supplementary storage services 52 are described in Bono et al. U.S. Pat. No. 7,631,155 issued Dec. 8, 2009, entitled "Thin Provisioning of a File System and an ISCSI LUN Through a Common Mechanism," incorporated herein by reference.

The data processor 30 is further programmed with a Small Computer System Interface (SCSI) or Fibre Channel (FC) driver 49 for linking the sparse metavolumes layer 48 to the data storage 31 through a storage adapter 34.

FIG. 1 shows that the data storage 31 stores a file system 38. The on-disk layout of the file system 38 includes a boot area 54, a superblock 55, an Mode list 56, and file system blocks 57. The boot area 54 may contain code for booting an operating system. The superblock 55 contains attributes and metadata of the file system itself. The Mode list 56 is a linear array of Modes. There is one Mode for each file in the file system. Each Mode can be identified by its Mode number, which equals its index in the Mode list. Several Modes may fit into one of the file system blocks 57. The Mode number can be easily translated into a block number and an offset of the Mode from the start of the block. Each Mode contains metadata of the file. (See Vahalia, *Unix Internals—The New Frontiers*, page 263.) Some of the file system blocks 57 are data blocks, and other file system blocks are indirect blocks, or free blocks that have not yet been allocated to any file in the file system.

Figure 2:
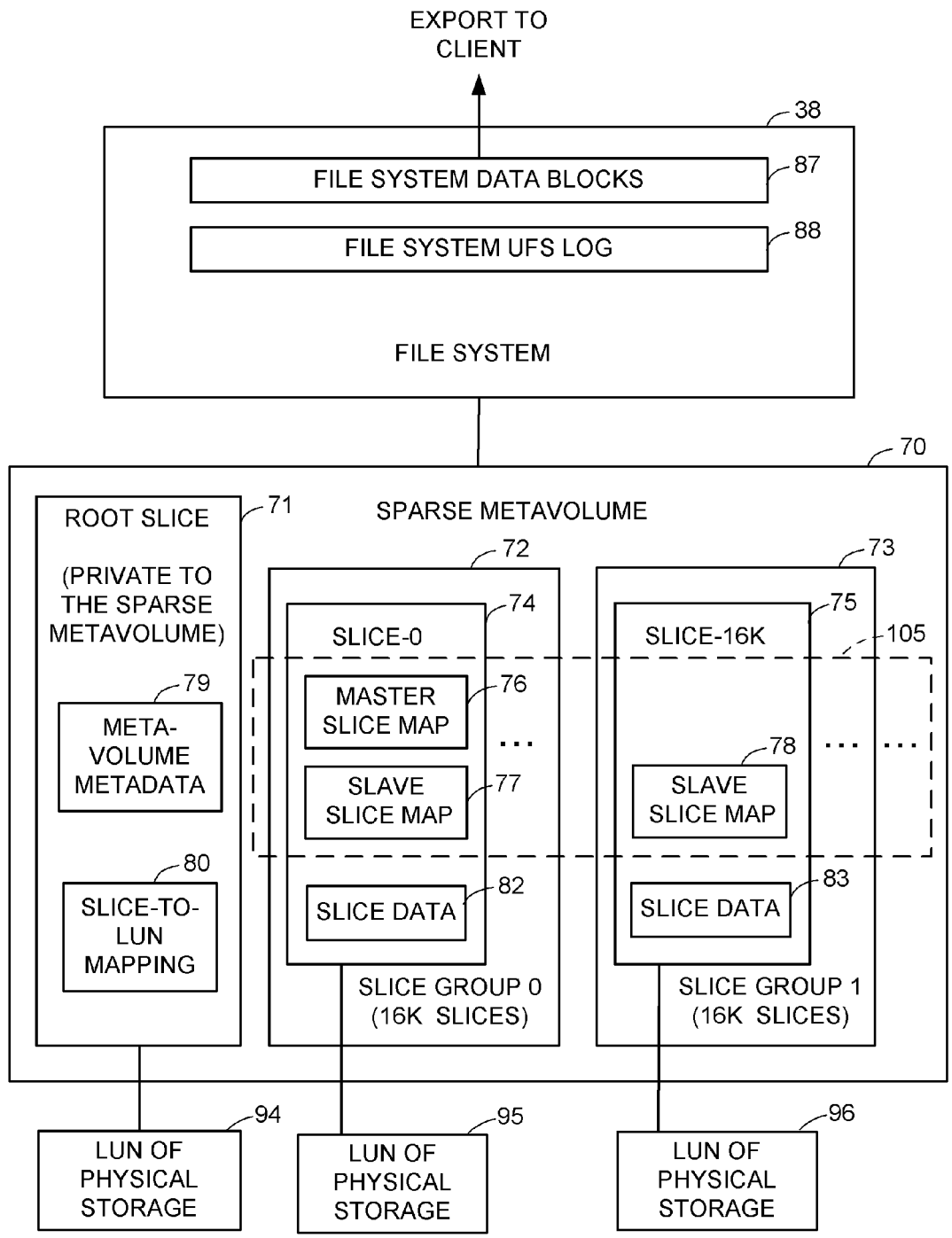
FIG. 2 is a block diagram showing a file server storage architecture including a sparse metavolume and a file system built on the sparse metavolume.

FIG. 2 shows that the file system 38 is built on a sparse metavolume 70 for enhanced decoupling of logical storage from physical storage. In addition to file system data blocks 87, the file system 38 includes a file system UFS log 88.

For thin provisioning of the file system 38, the sparse metavolume 70 has the ability to aggregate a plurality of slices of the same size of logical storage space together into a contiguous logical extent while some of these slices may or may not be provisioned. The sparse metavolume 70 includes a root slice 71, and hosts the file system's first slice group 72, and a second slice group 73. The sparse metavolume 70 can be extended to include up to about 8K of slice groups, and each slice group can have a logical extent of 16 terabytes, so that the sparse metavolume can support a file system 38 having up to 128 petabytes of storage.

The root slice 71 is always provisioned with backing store. The root slice 71 includes metadata 79 private to the sparse metavolume 70. In other words, the root slice 71 does not provide logical storage to the file system built upon the sparse metavolume 70. The metadata 79 in the root slice 71, for example, includes the size of the sparse multivolume and the constant size of each slice in the sparse metavolume 82. The root slice 71 may also include the slice-to-LUN mapping 80 of all of the slices in the sparse metavolume 70 to the LUNs 94, 95, 96 of backing storage for the sparse metavolume 70. The slice-to-LUN mapping 80 indicates whether or not any given slice of the sparse metavolume 70 is provisioned, and if so, a LUN identifier of the storage backing the provisioned slice. Each LUN 94, 95, 96 is configured from the same kind of storage in the cached disk array, but not all of the LUNS 94, 85, 96 need be configured from the same kind of storage.

The file system 38 can be configured with one or more slice groups 72, 73 up to the maximum number of 8K. A first slice group 72 is always configured by provisioning the first slice-0 74 in the logical extent visible to the file system built on the sparse metavolume 70. Each configured slice group also includes at least a first provisioned slice. For example, the second slice group 73 is configured by provisioning a slice 75, which is slice-16K in the logical extent of the sparse metavolume 70.

In use, the sparse metavolume 70 provides a sparse vector of backing storage slices 72, 73. Program layers above the sparse metavolumes program layer (48 in FIG. 1) access this sparse vector of backing storage slices as a logical extent of virtual storage, by writing data to and reading data from the sparse metavolumes program layer. The sparse metavolumes program layer (48 in FIG. 1) has no knowledge of how data is organized in this logical extent of virtual storage. Instead, the data contained in this logical extent of virtual storage is managed by program layers above the sparse metavolumes program layer (48 in FIG. 1).

As shown in FIG. 2, each provisioned slice in a slice group includes slice data. The slice-0 74 includes slice data 82, and the slice 75 includes slice data 83. Each slice data 82, 83 contains a respective portion of the logical extent of the sparse metavolume 70 that is visible to the file system 38. The logical extent of the sparse metavolume 70 visible to the file system begins with the slice data 82 in slice-0 74. For example, the file systems information in the slice data 82, 83 is managed by the container file system program layer (47 in FIG. 1).

The sparse metavolume 70 has a slice map hierarchy 105 that is distributed over slice-0 74, slice-16K 75, and the first slice of any other provisioned slice group of the sparse metavolume 70. As will be further described below with reference to FIGS. 8 and 9, the slice map hierarchy 105 includes file system visible resource counters for storage resources available to the file system 38. For example, the master slice map 74 includes resource counters for the entire file system and resource counters for each slice group that may possibly be provisioned for the sparse metavolume. Each slave slice map 77, 78 includes resource counters for each sub-group of its respective slice group, and each slice in each of these sub-groups.

In the programming of the file server 21 in FIG. 1, the resource allocation paths are modified to access and manage the slice map hierarchy 105 during searches for file system resources, and in response to the allocation and de-allocation of file system blocks and Modes, and the provisioning and un-provisioning of the slices with backing storage. The modified resource allocation programming is further described below with reference to FIGS. 14 to 19.

In the slice map hierarchy 105, the kind of storage backing each slice is indicated by a particular value of a parameter called the automatic volume management (AVM) type of the storage. Storage having a similar group of performance characteristics (such as access time and bandwidth) is indicated by the same value for the AVM type. Thus, the slice map hierarchy 105 provides a way of quickly searching for a free block of storage in a provisioned slice of a given AVM type in the metavolume. In addition, the slice map hierarchy 105 is used for selecting a slice for evacuation in the shrink process.

The shrink process may remove a provisioned slice from anywhere in the sparse metavolume 70, except there are restrictions on the root slice 71 and also the first slice of each slice group. The root slice 71 may only be relocated to storage of a different type but which should be present at all times during the relocation process. Slice-0 74 is always pinned. The first slice of any other slice group is pinned as long as it is not alone in the slice group, as it must be present to describe those other slices.

In the shrink process, the statistics maintained in the slice map are used to determine which provisioned slice should be selected to have its blocks de-allocated, without having to search all of the cylinder groups of the file system. When a provisioned slice is selected for deallocation in accordance with a configured shrink policy, the storage reorganizer is invoked to migrate the data of allocated file system blocks to free file system blocks of other provisioned slices in the file system, and to remap the migrated file system blocks in the cylinder group. After all the data of all of the file system blocks have been vacated from the slice, the storage slice object is removed from the sparse metafile system and returned to a pool of free slices.

When it is desired to provision a sparse metavolume with a configured slice object of a desired size and a desired AVM type, the configured slice object is taken from a pool of configured slices having the desired size and AVM type. A sparse metavolume can be provisioned with slices having different AVM types, and in this case the configured slice objects are taken from different pools of configured slices. When a configured slice object is removed from the sparse metavolume, the configured slice object is returned to a pool of configured slices having the same size and AVM type as the configured slice object that is removed from the sparse metavolume.

Figure 3:
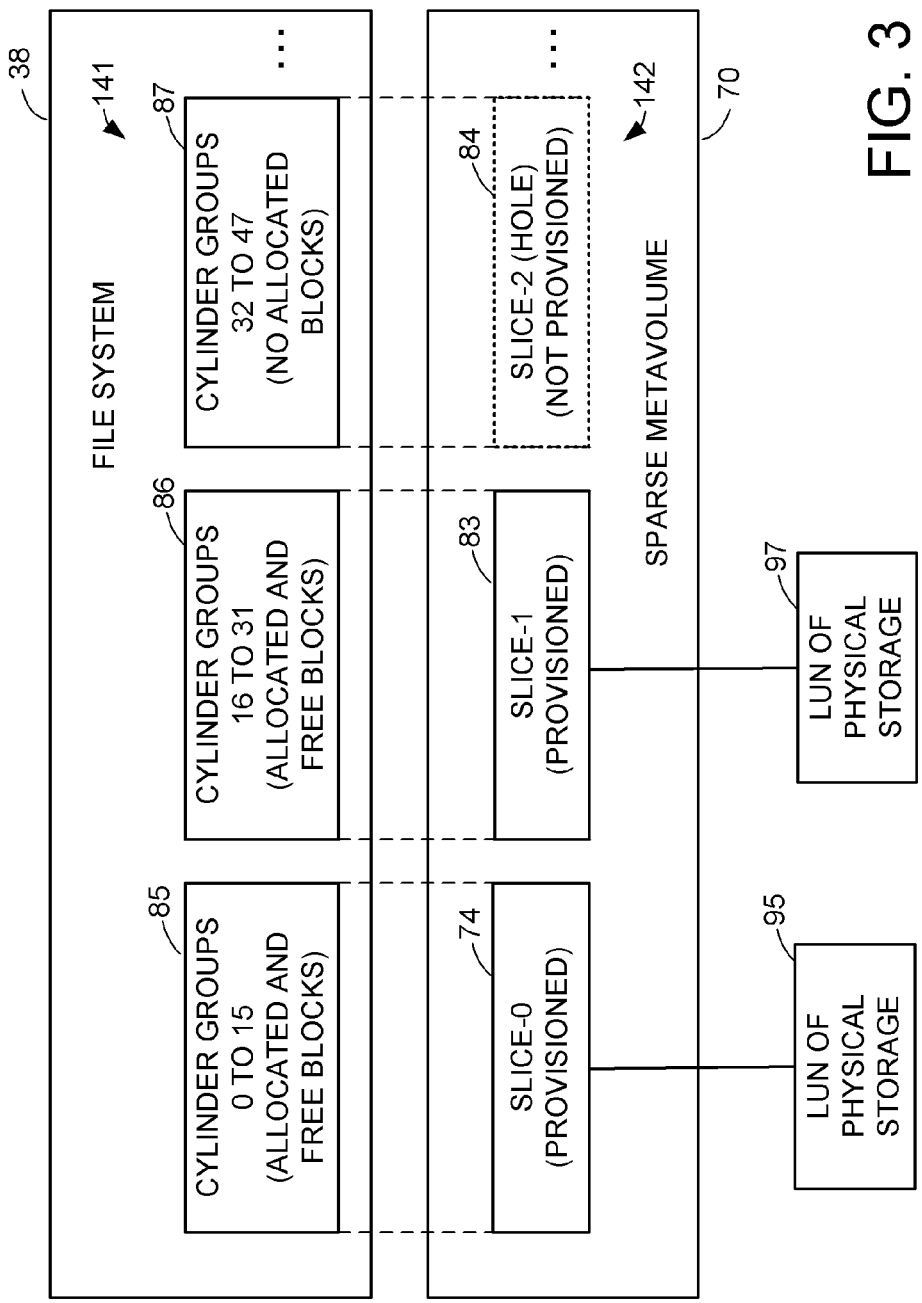
FIG. 3 is a block diagram showing a specific mapping of cylinder groups in a file system to slices in the logical extent of a sparse metavolume.

FIG. 3 shows a relationship between cylinder groups 141 in the file system 38 and slices of storage 142 in the sparse metavolume 70. The logical extent of the file system 38 is subdivided into self-contained cylinder groups 141 of file system blocks. Each slice 142 of the sparse metavolume 70 contains a certain multiple of cylinder groups of the file system 38. For a given file system, each cylinder group has the same size. For example, the file system block size is 4 kilobytes or 8 kilobytes, the cylinder group size is 64 megabytes, and the slice size is 1 gigabyte, so that a slice contains sixteen cylinder groups. At any given time, storage for each slice of the sparse metavolume 82 is either provisioned or not. If a slice is provisioned, then all of the cylinder groups within that slice are, by definition, provisioned. If storage for a slice is not provisioned, then there is said to be a hole at that location in the logical extent of the sparse metavolume.

For example, in FIG. 3, cylinder groups 85 are contained in slice-0 74, which is provisioned by the LUN 95, so that the cylinder groups 85 may contain allocated or free file system blocks. Also, in FIG. 3, cylinder groups 86 are contained in slice-1 83, which is provisioned by the LUN 97, so that the cylinder groups 86 may contain allocated or free blocks. In FIG. 3, the space for cylinder groups 87 is contained in a not-provisioned slice-2 84, so that the cylinder groups 87 are not instantiated.

Figure 4:
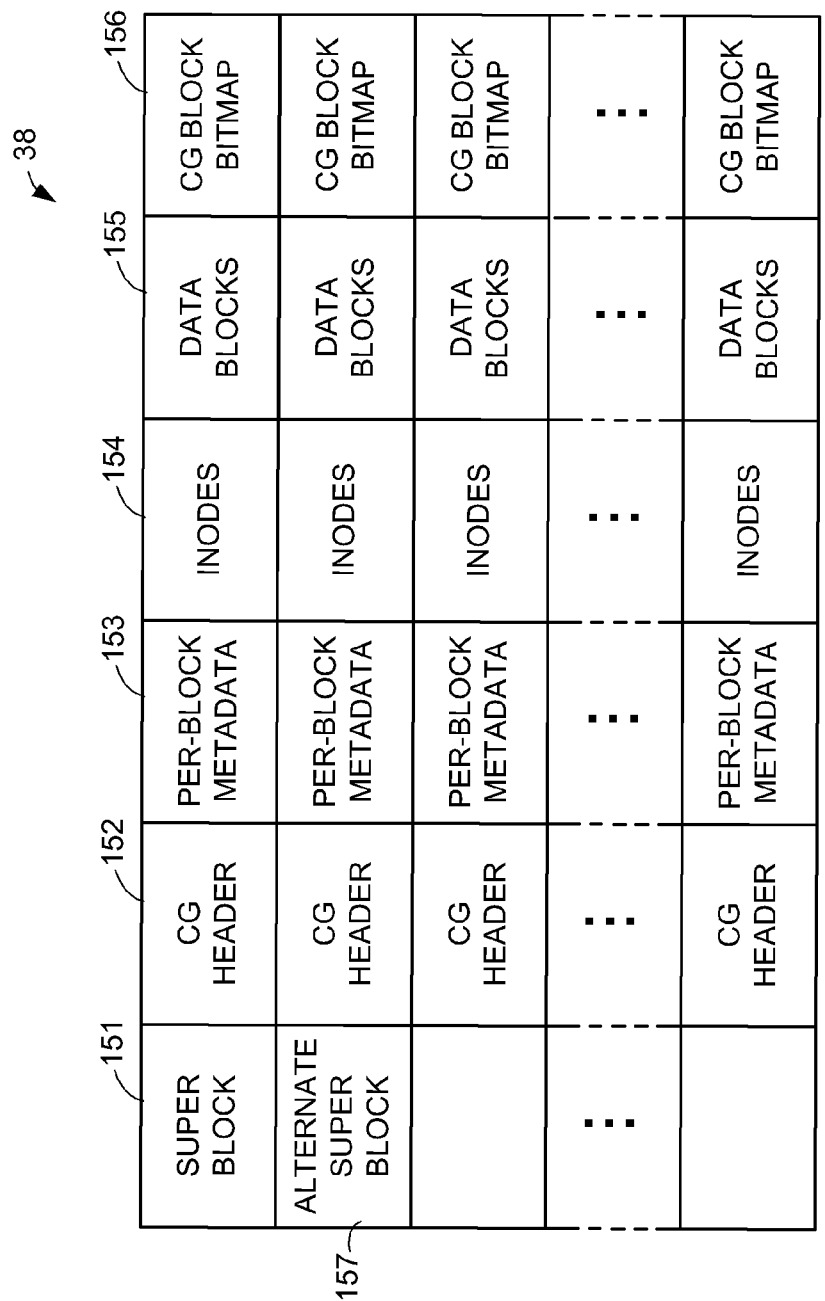
FIG. 4 is a block diagram showing components of cylinder groups of a file system.

FIG. 4 shows a memory map of the logical extent of the file system 38. Each cylinder group (CG) of the file system is a respective row in this memory map. The first cylinder group contains a superblock 151 of file system metadata, a cylinder group header 152, file system blocks for per-block metadata 153 for the file system blocks in the cylinder group, Modes 154 of the cylinder group, file system data blocks 155 for the cylinder group, and a cylinder group block bitmap 156 for indicating whether or not each file system block in the cylinder group is allocated or not.

A block can be in one of three states: allocated, free, or reserved. A reserved block cannot be allocated or freed. The allocated/free state is tracked in the block bitmap, and the reserved state is implicit in the block number. For example, a few bits in the block number field are reserved for indicating block state. One bit has always been used to indicate the non-owner status of a block in a version file. A second bit is reserved to indicate bad block status, for example upon detection of a media sector error, duplicate allocation, or other corruption. A third bit is reserved to indicate that the block is in a relocated extent of the file system. A few more bits are reserved for future use.

The per-block metadata includes an inode number of the file in the file system including the file system block, the offset of the block within the file in the file system, a checksum for the block, and a deduplication hash entry for the block. The inode number and offset for the block are updated in the same transaction that updates the allocation state in the cylinder group block bitmap 156. The deduplication hash entry, for example, is a pointer to any list of inode and offsets sharing the block, or else a null or zero value if the block is not shared. The per-block metadata for each file system block also includes an internal checksum protecting the integrity of the 256 bits of per-block metadata.

A field in the cylinder group superblock 151 records the object types whose checksums are recorded in the per-block metadata. For example, checksums are most important for indirect blocks and slicemap blocks. When used, the checksum is updated in synchronization with updating of the file system block.

The per-block metadata 153 is not directly accessible to a network client, and instead it is implicitly accessed in the process of a file system operation that makes use of the cylinder group or block contents. For example, the process of allocating or freeing a block of the cylinder group validates and updates block metadata owner state. A process of allocating a new pointer in an indirect block updates the block metadata checksum for the indirect block, and adding or removing a slice updates the checksum on the slicemap block.

Figure 5:
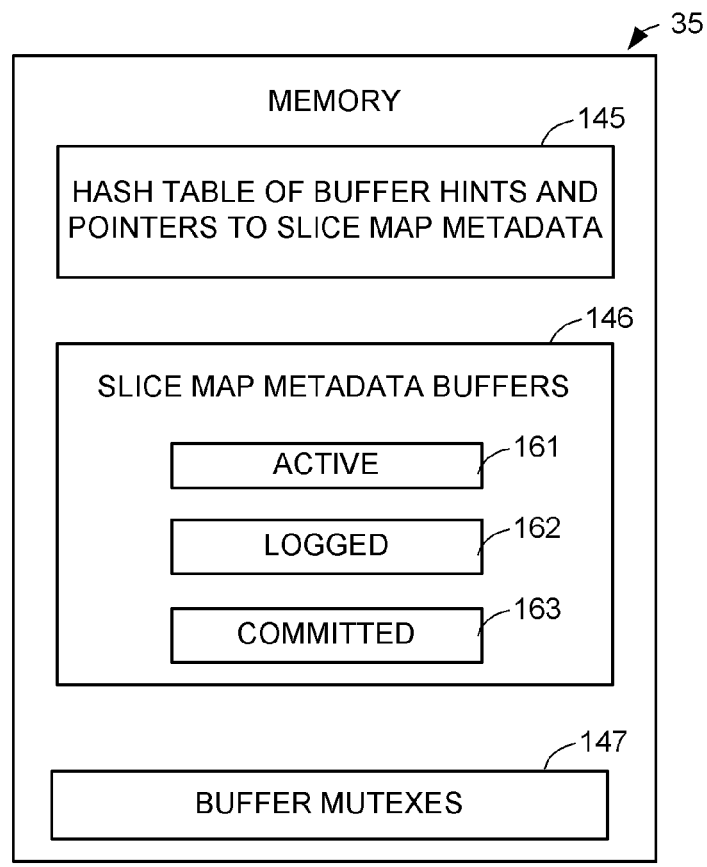
FIG. 5 is a block diagram of mapped-in-memory portions of the on-disk slice map.

As shown in FIG. 5, the random access memory 35 includes slice map metadata buffers 146 for containing mapped-in-memory portions of the on-disk slice map. The random access memory 35 also includes a hash table 145 containing buffer hints and pointers to the slice map metadata buffers 146. The random access memory 35 also includes buffer mutexes 147 for serializing access to the buffers 146 or ranges of entries in the buffers 146. Portions of the per-block metadata (153 in FIG. 4) are mapped in memory in a similar fashion.

The slice map metadata buffers 146 include active copies 161, logged copies 162, and committed copies 163. The three kinds of copies provide transactional consistency. An active copy 161 tentatively tracks the state of a transaction that has not been committed to the UFS log. A logged copy 162 is updated only as a transaction is committed to the UFS log and copied there, so that the log accurately reflects a fully serialized sequence of counter updates. A committed copy 163 is updated only after a transaction is committed to the UFS log. Buffers containing updated committed copies are periodically flushed to update the on-disk, persistent representation of the slice map. The buffer hints facilitate re-reading of the active buffers.

Figure 6:
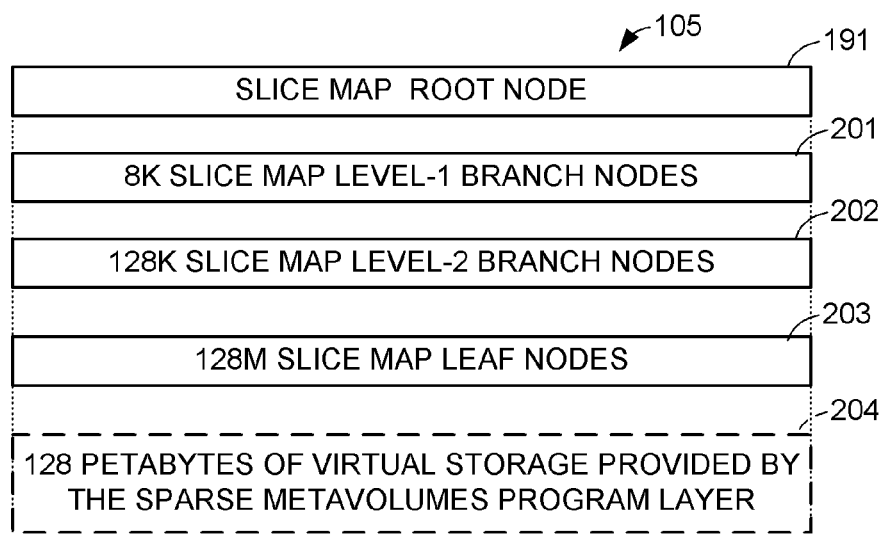
FIG. 6 is a block diagram of multiple levels in the slice map hierarchy.

FIG. 6 shows the levels of the slice map hierarchy 105 for the file server 21 of FIG. 1 to support a file system having a logical extent of up to 128 petabytes of virtual storage provided by the sparse metavolume 70 in FIG. 3. The top level in FIG. 6 is a slice map root node 191. The slice map root node 191 includes a summary of storage resources over the entire file system. The slice map hierarchy also has an upper level 201 of level-1 branch nodes including summaries of storage resources over groups of slices. The slice map also has an intermediate level 202 of level-2 branch nodes including summaries of storage resources over sub-groups of the slices. The slice map hierarchy also has a bottom level 203 of slice map leaf nodes including summaries of storage resources in each of the slices of the data storage.

The nodes at a lower level of the slice map hierarchy describe the storage resources in the file system with a finer level of granularity than the nodes at a higher level of the slice map hierarchy. There are more nodes at the lower levels than the higher levels of the slice map hierarchy. For example, each level 191, 201, 202, 203, covers 128 petabytes of virtual storage 204, and the slice size is 1 gigabyte. A slice map level-1 branch node covers 16 terabytes and a slice map level-2 branch node covers 1 terabyte, so that there are sixteen times as many level-2 branch nodes than level-1 branch nodes. Given that there are 8,192 (8K) slice-map level-1 branch nodes 201, then there are 131,072 (128K) level-2 branch nodes 202. For a slice size of 1 gigabyte, there are 134,217,728 (128M) slices so there are 134,217,728 (128M) slice map leaf nodes 203.

Figure 7:
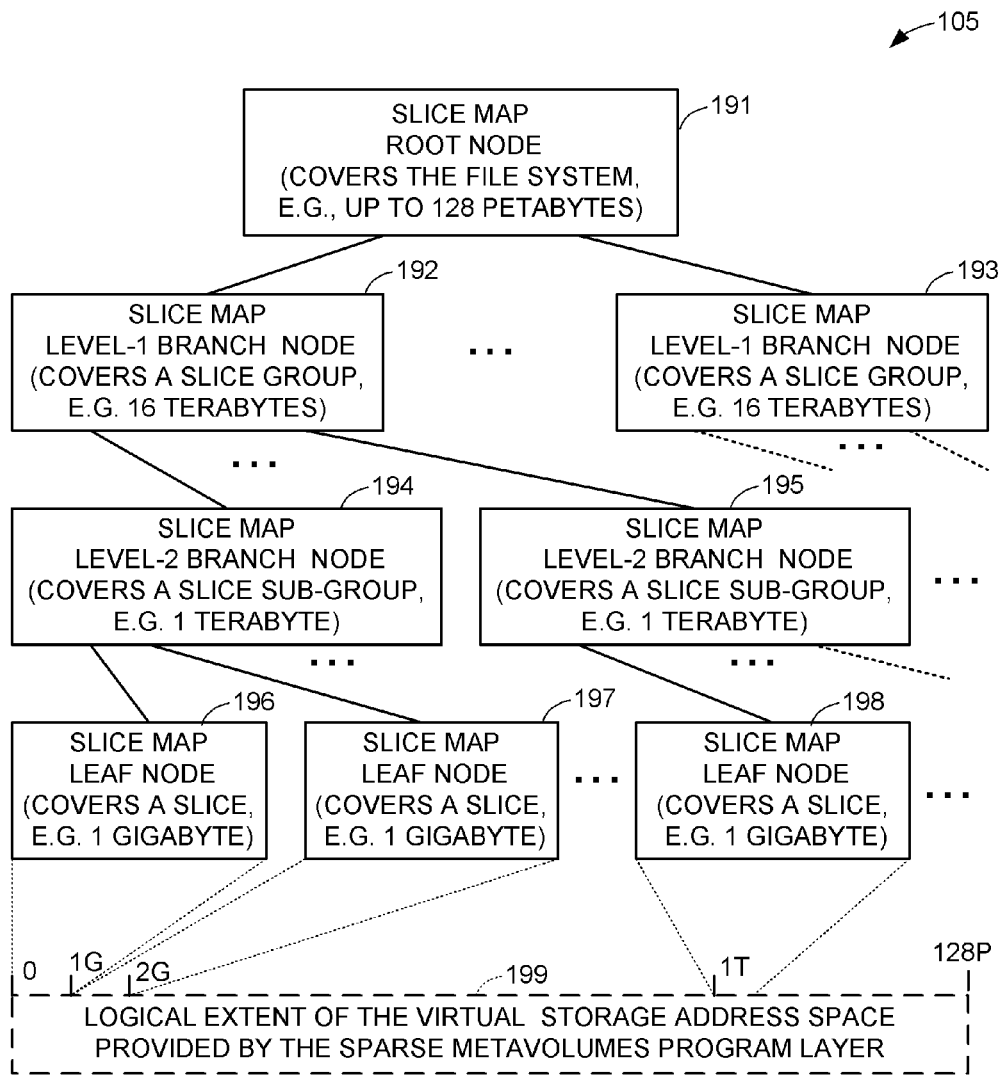
FIG. 7 is a block diagram of parent-child relationships between nodes in the slice map hierarchy.

FIG. 7 shows some of the nodes in the slice map hierarchy 105. The root node 191 at the top of the slice map hierarchy 105 counts free resources over the entire logical address range of the file system. The level-1 branch nodes 192, 193 count free resources over 16 terabyte (TB) extents, the level-2 branch nodes 194, 195 count free resources over 1 TB extents, and the slice map leaf nodes 196, 197, 198 count free resources over 1 gigabyte (GB) extents. Each slice map leaf node 196, 197, 198 covers the 64 megabyte (MB) extents of the cylinder groups in one slice.

The slice map nodes have a fixed size at each level and have a fixed arrangement in the logical extent of the sparse metavolume address space so that desired information in the slice map hierarchy can be addressed quickly by appropriate arithmetic computations. For the specific example shown in FIG. 3, the slice map hierarchy 105 includes the master slice map 76 and the slave slice maps 77, 78 for each of the provisioned slices 72, 73. The master slice map 76 and the slave slice map 77 for the first slice group 72 are always contained in slice-0 so that they are always provisioned with backing store. In addition, there is no need to access any slave slice map for any unprovisioned slice group during a search of the slice map hierarchy 105 for free storage resources. For example, the master slice map 76 indicates whether or not each slice group is provisioned or not with backing store, and the resource count associated with an unprovisioned slice group has a value of "undefined" or zero.

The slice map hierarchy 105 has a single slice map root node at a fixed address in the logical extent of the sparse metavolume. There are also a fixed number of slice map level-1 branch nodes beginning at a fixed address in the logical extent of the sparse metavolume. The level-1 branch nodes can therefore be addressed as an array having an index (i) denoting the ith level-1 branch node. Each level-1 branch node has a certain number of children (NCH1) also starting at a fixed address for a given (i) and therefore the level-2 branch node for given slice group (i) can be addressed as an ith array indexed by (n) where (n) ranges from zero to (NCH1-1). In other words, the address of the nth level-2 node for a given slice group (i) is obtained by performing an algebraic computation upon the index (i) and the index (n).

For example, in the logical extent of the sparse metavolume, the first slave slice map 77 in slice-0 74 has a certain address (BASE). There is a constant address spacing (SLAVE_MAP_SPACING) between the addresses of the slave maps for neighboring slice groups. Each slave map includes an array of level-2 branch nodes, so that there also is a constant address spacing (LEVEL_2_NODE_SPACING) between the level-2 branch nodes in each slave map. Then the address of the nth level-2 node for a given slice group (i) is given by:

$$\text{Address} = \text{BASE} + (i)*\text{SLAVE\_MAP\_SPACING} + (n)*\text{LEVEL\_2\_NODE\_SPACING}$$

A unique index (j) for each level-2 branch node is given by j=(i*NCH1)+n. In a similar fashion, each slice map level-2 branch node has a certain number of children (NCH2) also starting at a fixed address for a given (i), and therefore the leaf nodes for a given slice group (i) can be addressed as an ith array indexed by (n, m) where m ranges from zero to (NCH2-1). A unique index (k) for each leaf node is given by k=(j*NCH2)+m.

Figure 8:
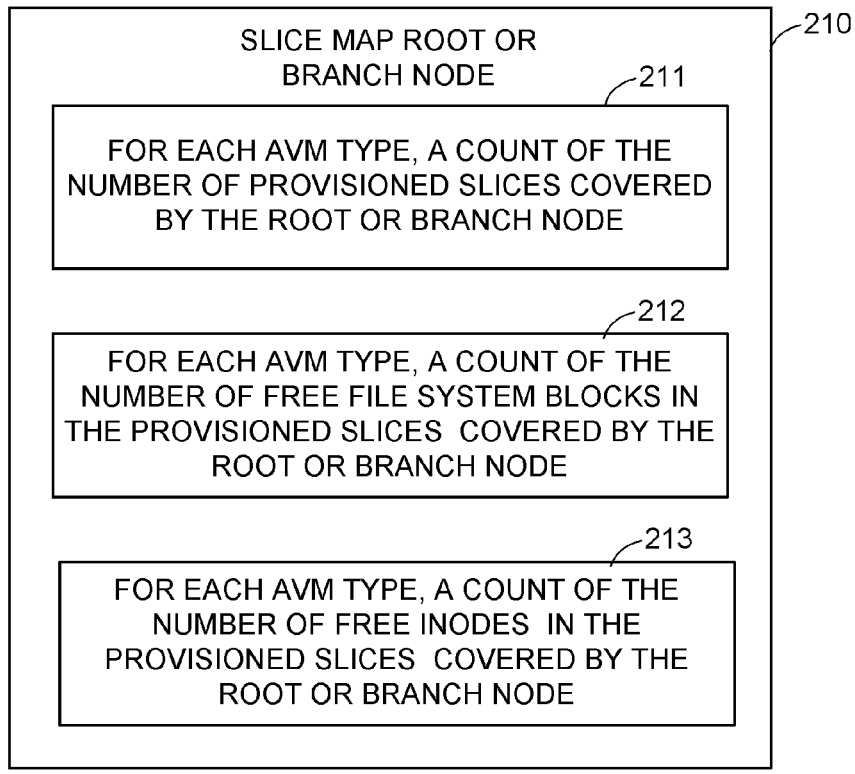
FIG. 8 is a block diagram of a root node or a branch node in the slice map hierarchy.

FIG. 8 shows that the slice map root node or a branch node 210 includes summary information about the storage resources covered by the root or branch node. For example, the summary includes, for each AVM type, a count 211 of the number of provisioned slices covered by the root or branch node, a count 212 of the number of free file system blocks in the provisioned slices covered by the root or branch node, and a count 213 of the number of free inodes in the provisioned slices covered by the root or branch node.

Figure 9:
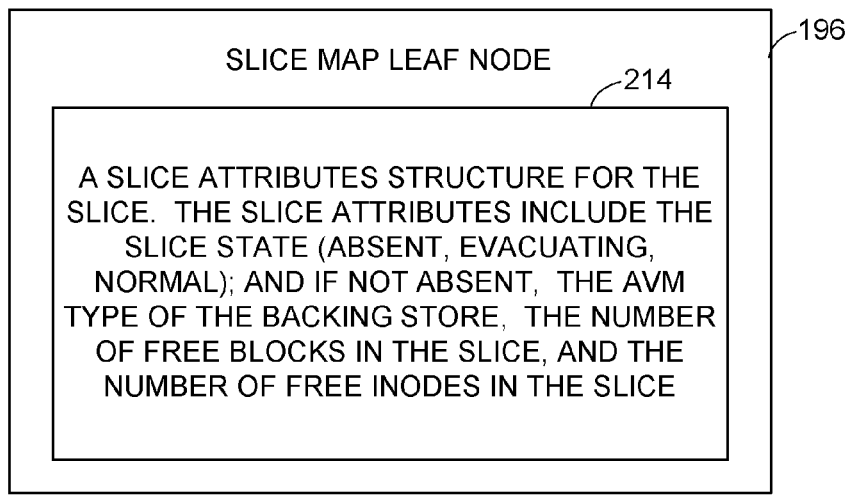
FIG. 9 is a block diagram of a leaf node in the slice map hierarchy.

FIG. 9 shows that a slice map leaf node 196 includes a slice attributes structure 214 for the particular slice corresponding to the slice map leaf node. The slice attributes contained in the structure 214 include the slice state (backing store absent, evacuating, or normal), and if the backing store is not absent, then the AVM type of the backing store, the number of free blocks in the slice, and the number of free inodes in the slice.

The summary information in a parent node is obtained by a summation or count of the summary information or slice attributes in the child nodes of the parent node. In the root or a level-1 branch node, the number of slices provisioned with backing store of a given AVM type in the parent node is the sum of the number of slices of the AVM type found in the child nodes. In the level-2 branch node, the number of slices provisioned with backing store of a given AVM type is a count of the number of child leaf nodes that do not have the slice state of absent and have the AVM type.

Figure 10:
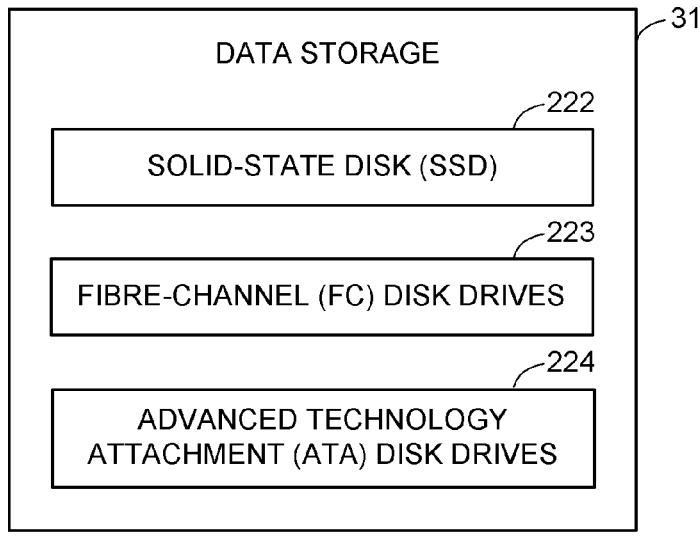
FIG. 10 is a block diagram of different kinds of data storage devices having different performance characteristics in the data storage of the file server of FIG. 1.

FIG. 10 shows different quality-of-service classes of storage in the data storage 31. The data storage includes solid-state storage 222 emulating disk storage (SSD), Fibre-Channel (FC) disk drives 223, and advanced technology (ATA) disk drives 224. Thus, the AVM type could designate a tier in a storage hierarchy such as AVM=1 for slices stored in the solid-state disk 122, AVM=2 for slices stored in the Fibre-Channel disk, and AVM=3 for slices stored in the ATA disk drives. In this case, a higher AVM type indicates a decrease in performance and also a decrease in the cost of storage. As stored in a leaf node of the slice map hierarchy, AVM=0 could be reserved to indicate that backing storage is absent.

The management of a file system and the underlying sparse metavolume can automatically provision the file system with storage of an appropriate AVM type as needed in accordance with configured storage policies and usage history or express desire of a particular client. File system blocks provisioned to the file system are later allocated to a file in the file system when a file is created, and when the file is extended, or when a hole in the file is filled during a write to the hole in the file. File system blocks of a specified AVM type may be allocated to a particular file in the file system, and the specified AVM type may change over time in accordance with the life cycle of the file.

Figure 11:
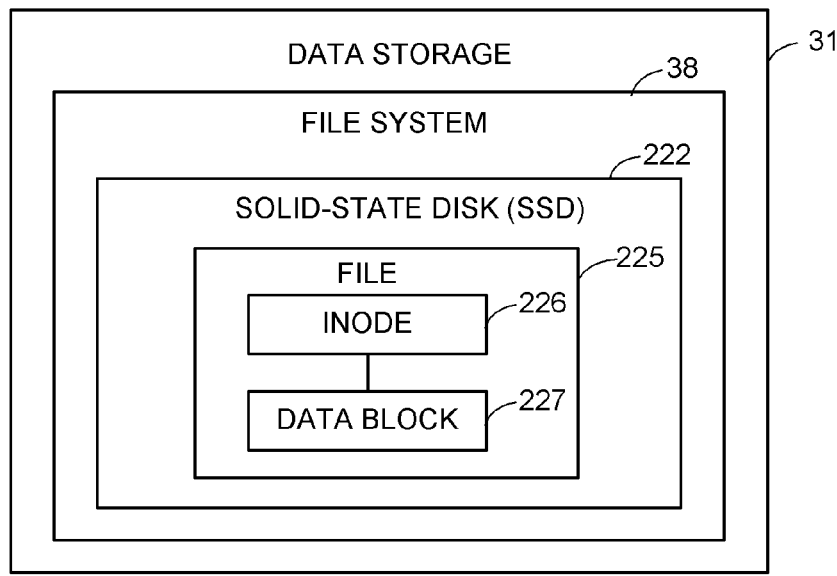
FIG. 11 shows a file created in solid-state disk (SSD) storage.

For example, as shown in FIG. 11, a file 225 is created in the on-disk file system 38 using storage having a specified solid-state disk 220 AVM type. The file 225 includes an inode 226 and a data block 227 allocated from the solid-state disk storage 222.

Figure 12:
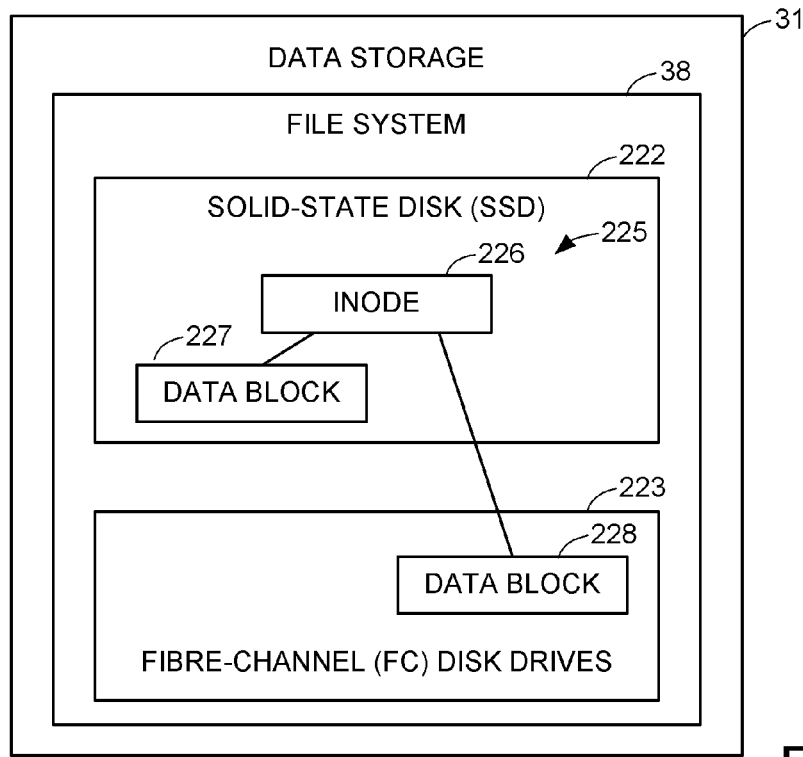
FIG. 12 shows the file of FIG. 11 extended to include a data block in fibre-channel (FC) disk storage.

As shown in FIG. 12, some time after the file 225 is created, the file becomes less frequently accessed, so new writes to the file 225 are targeted to newly allocated storage of a different specified AVM type, such as the fibre-channel disk 223. Therefore the file is extended by allocating an additional data block 228 to the file, and new data is written to the data block 228 and the data block 228 is linked to the file 225.

Figure 13:
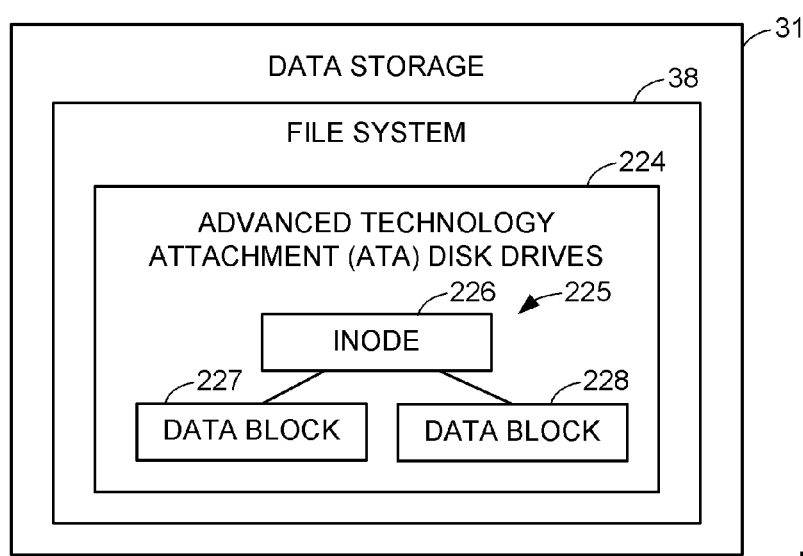
FIG. 13 shows the file of FIG. 12 migrated to Advanced Technology Attachment (ATA) disk storage.

Some time later, as shown in FIG. 13, when the file has not been recently accessed, the storage reorganizer migrates the file to storage having yet another specified AVM type, such as the ATA disk storage 224, so that the inode 226 and the file system data blocks 227, 228 become stored in the ATA disk storage 224.

The slice map hierarchy as introduced in FIGS. 8 and 9 provides more efficient and deterministic allocation of file system blocks of a desired AVM type, especially on a highly utilized file system. A straight downward search through the slice map hierarchy from the root node locates a free block of the desired AVM type with increasingly greater precision until a cylinder group is located having such a free block of the specified AVM type. Typically the slice map nodes along the downward search path are found in the file system cache, and at most one I/O is performed at each level of the slice map hierarchy.

When there is a need to allocate a block to a file in the file system, the hierarchical slice map is searched in a top-down fashion in order to find a cylinder group of the file system including a free block of the data storage. The free block of the data storage is then linked to the file, and the hierarchical slice map is updated to reflect that the block linked to the file is no longer free. For example, the container file systems program layer (47 in FIG. 1) includes program routines for searching the slice map to find the free block of the data storage to allocate to the file, and for updating the slice map when a block of data storage in the file system is allocated or freed, as further described below with reference to FIGS. 14 to 18.

In general, searching of the hierarchical slice map in a top-down fashion includes scanning the vector of slice group resource descriptors in a parent node until one of the resource descriptors is found to indicate the presence of at least one free block in one of the groups of the slices covered by the parent node. Upon finding that one of the resource descriptors indicates the presence of at least one free block in one of the groups of the slices covered by the parent node, the search continues down to the child node containing the vector of slice sub-group resource descriptors indicating a presence or absence of at least one free block in each of the sub-groups of the slices included in the one of the groups of slices covered by the parent node.

Figure 14:
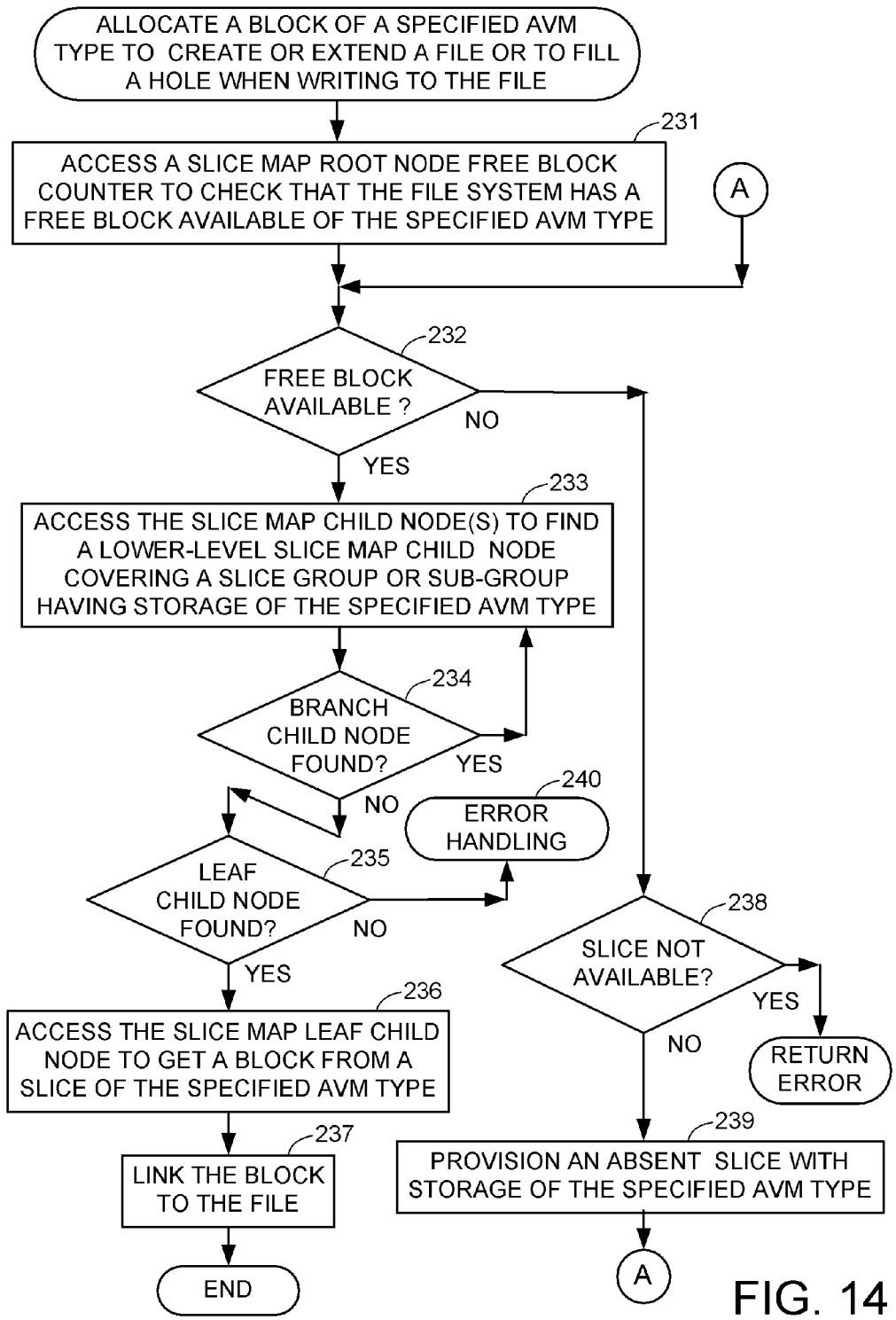
FIG. 14 is a high-level flowchart of a procedure for allocating a block to a file.

FIG. 14 shows an example of a routine for allocating a block of a specified AVM type to create or extend a file or to fill a hole when writing to the file. In a first step 231, the slice map root node is accessed to read a free block counter for the specified AVM type to check that the file system has a free block available of the specified AVM type. If a free block is available, then in step 233 one or more of the slice map child nodes are accessed to find a lower-level slice map child node covering a slice group or slice sub-group having a free block of storage of the specified AVM type.

In step 234, if such a branch child node is found, then execution loops back to step 233 to access the slice map child node to find a lower-level slice map child node covering a slice sub-group having a free block of storage of the specified AVM type. Otherwise, execution continues to step 235. In step 235, if such a slice map child node is found and the node is a leaf node, then execution continues to step 236 to access the slice map child leaf node to get a block of storage from the slice of the specified AVM type. Execution continues from step 236 to step 237. In step 237, the block of storage of the specified AVM type is linked to the file, and the procedure of FIG. 14 is finished.

In step 232, if a free block of the specified AVM type was not indicated by the root node free block counter for the AVM type, then execution branches from step 232 to step 238. In step 238, if a slice is not available for provisioning with storage of the specified AVM type, then execution returns with an error message indicating that a free block of the AVM type is not available and a slice is not available for provisioning with storage of the AVM type. Otherwise, execution continues from step 238 to step 239 to provision an absent slice with storage of the specified AVM type, and then execution loops from step 239 back to step 232.

In step 235, if the accessing of the free block counters of the child nodes in step 233 did not find a lower-level slice map child node covering a slice sub-group having a free block of storage of the specified AVM type, then the slice map child nodes in step 233 have become inconsistent with their parent node. In the absence of an error, the slice map child nodes should not be inconsistent with their parent node. In this case, execution branches from step 235 to error handling in step 240.

In practice, a background routine can be used to provision the sparse metavolume with backing storage when a low-space threshold is crossed. In this case, step 239 of FIG. 14 normally would not be reached because the background routine would keep the file system provisioned with some free storage until the file system becomes full. Therefore an allocation request would not suffer the latency of provisioning the slice in step 239.

The slice map hierarchy is initialized when slice-0 is provisioned during the initial configuration of the sparse metavolume. The slice map hierarchy is updated upon provisioning or evacuating a slice with backing store, or allocating or de-allocating a file system block or inode. The updating to the slice map hierarchy includes updating, at each level, the node covering the virtual address of the slice that is provisioned or evacuated, or the virtual address of the file system block or inode that is allocated or de-allocated.

In practice, it is desirable to permit sharing of the slice map hierarchy between a user allocation routine and the storage reorganizer. The user allocation routine has priority over the storage reorganizer, and tries to avoid interfering with the reorganizer, but will do so if storage resources cannot otherwise be found for a user allocation request. When the reorganizer is working in a slice, it records that information in the descriptor for that slice. A user allocation request will be satisfied with storage from such a slice only if the user allocation routine has searched the slice map hierarchy for the user allocation request and has determined that free resources are to be found only in slices that the reorganizer is working in. In such a case, the user allocation routine records, in the slice descriptor, the fact that the user allocation routine is allocating storage from the slice. Therefore, while evacuating storage from a slice, the reorganizer polls the slice descriptor looking for an indication that the user allocation routine is active in the slice, and if the reorganizer finds such an indication, it abandons its work in the slice. In this fashion, the reorganizer is prevented from working against user allocations. Similarly, the reorganizer will not begin work on a slice while a user allocation is active in the slice.

Resource allocation in the slice map hierarchy is deterministic such that if resources are found at the top of the slice map hierarchy, then the resources will always be found at the lower levels of the hierarchy. This is accomplished by pre-allocating resources in a top-down fashion through the hierarchy, and freeing resources in a bottom-up fashion through the hierarchy. The guarantee is relaxed for specialized resource requests; e.g., contiguously located blocks.

Figure 15:
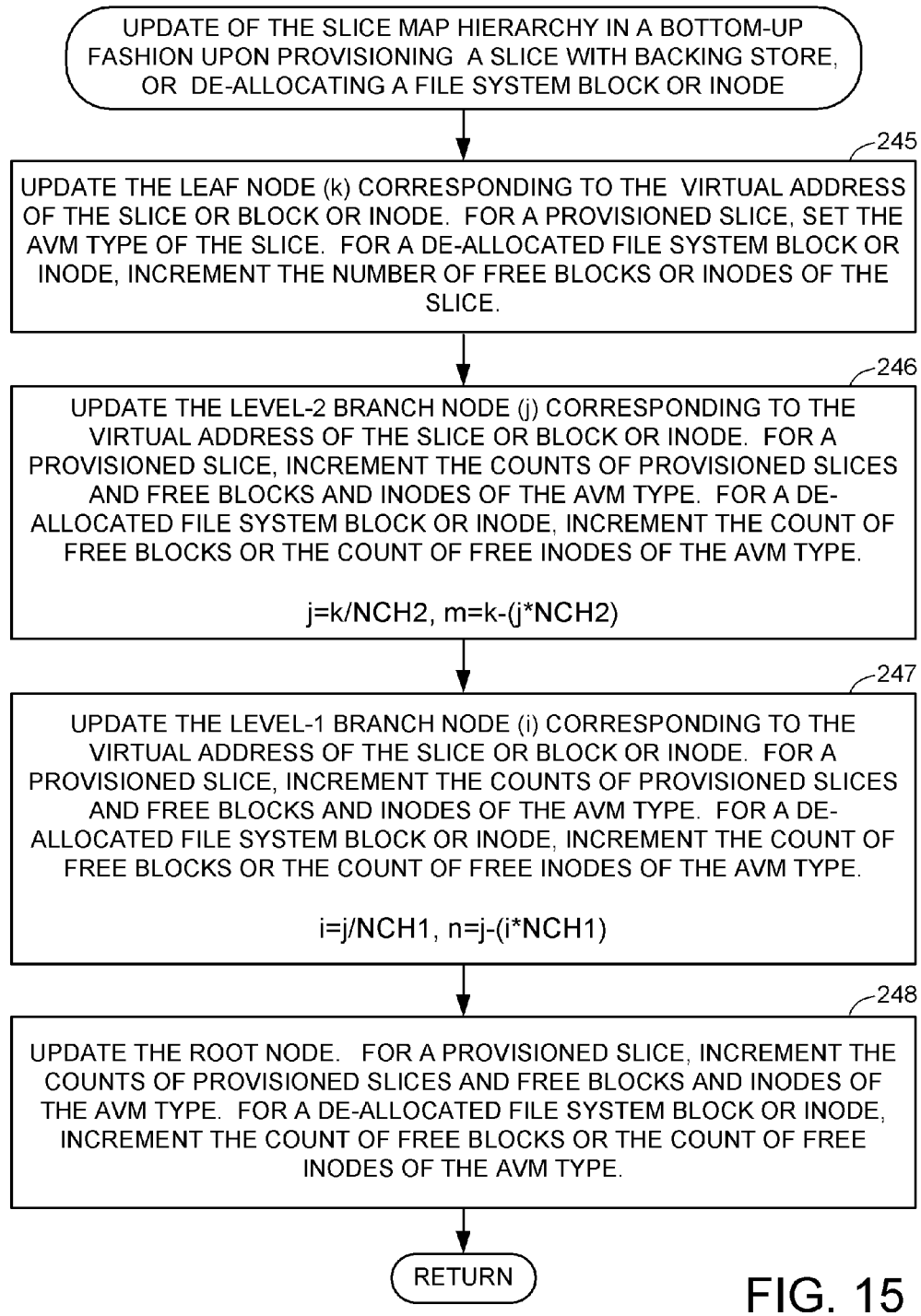
FIG. 15 is a flowchart of a procedure for updating the slice map hierarchy in a bottom-up fashion upon provisioning a slice with backing store, or de-allocating a file system block or inode.

FIG. 15 shows further details of the updating of the slice map hierarchy in a bottom-up fashion upon provisioning of a slice with backing storage or de-allocating a file system block or inode. In a first step 245 of FIG. 15, the leaf node (k), corresponding to the virtual address of the slice or block, is updated. The index (k) is computed from the virtual address of the slice or block or inode by an integer division by the slice size. If a slice is provisioned, then the AVM type of the slice is set to indicate the AVM type of the backing store, and the number of free blocks for the slice is set to the number of free blocks in a provisioned slice. If a block is de-allocated, then the number of free blocks for the slice is incremented. If an inode is de-allocated, then the number of free inodes for the slice is incremented. Execution continues from step 245 to step 246.

In step 246, the level-2 branch node (j), corresponding to the virtual address of the slice or block or inode, is updated. The index (j) is computed by dividing the index (k) by NCH2, where NCH2 is the number of child nodes of a level-2 branch node. The array index (m) is computed by subtracting the product of (j) and NCH2 from (k). If a slice is provisioned, then the number of slices of the AVM type is incremented, and the number of free blocks of the AVM type is incremented by the number of free blocks in a provisioned slice. If a block is de-allocated, then the number of free blocks of the AVM type is incremented. If an inode is de-allocated, then the number of free inodes of the AVM type is incremented. Execution continues from step 246 to step 247.

In step 247, the level-1 branch node (i), corresponding to the virtual address of the slice or block or inode, is updated. The index (i) is computed by dividing the index (j) by NCH1, where NCH1 is the number of child nodes of a level-1 branch node. The array index (n) is computed by subtracting the product of (i) and NCH1 from (j). If a slice is provisioned with backing store, then the number of slices of the AVM type is incremented and the number of free blocks of the AVM type is incremented by the number of free blocks in a provisioned slice. If a block is de-allocated, then the number of free blocks of the AVM type is incremented. If an inode is de-allocated, then the number of free inodes of the AVM type is incremented.

In step 248, the slice map root node is updated. If a slice is provisioned with backing store, then the number of slices of the AVM type is incremented, and the number of free blocks of the AVM type is incremented by the number of free blocks in a provisioned slice. If a block is de-allocated, then the number of free blocks of the AVM type is incremented. If an inode is de-allocated, then the number of free inodes of the AVM type is incremented.

In practice, it is desired to search for multiple free blocks while performing a single downward search. Moreover, it is usually desired to allocate the multiple free blocks from the same slice, or possibly from neighboring slices, so that the blocks are contiguous in the file system. This can be done by pre-allocating the multiple free blocks during the downward search though the hierarchy. If all of the resources cannot be found in a single child node, then portions of the desired storage resources are pre-allocated at sibling nodes in the slice map hierarchy.

A special case arises in which the count of a general type of resource at a parent node is not sufficiently precise to guarantee that the specific kind of resources present at the child nodes will satisfy the request. For example, it may be desired to allocate an extent of contiguous blocks. A free blocks counter of a parent node may indicate that the desired number of free blocks are available from the child nodes but the child nodes must be searched before it is known whether these free blocks available from the child nodes are contiguous. In this special case, the desired number of blocks are pre-allocated at the parent node, and if the search of the child node indicates that only a subset of these blocks are contiguous, then the subset of the blocks are pre-allocated from the children, and the remaining blocks are released from the pre-allocation at the parent. Thus, the search returns to the parent to credit the parent's resource counter with the difference between what was pre-allocated at the parent and the subset that was found and pre-allocated at one or more of the child nodes. Thus, a collection of contiguous blocks available from a number of slices can be pre-allocated from the resource counters in the slice map hierarchy before the contiguous blocks are actually allocated in the file system.

Figure 16:
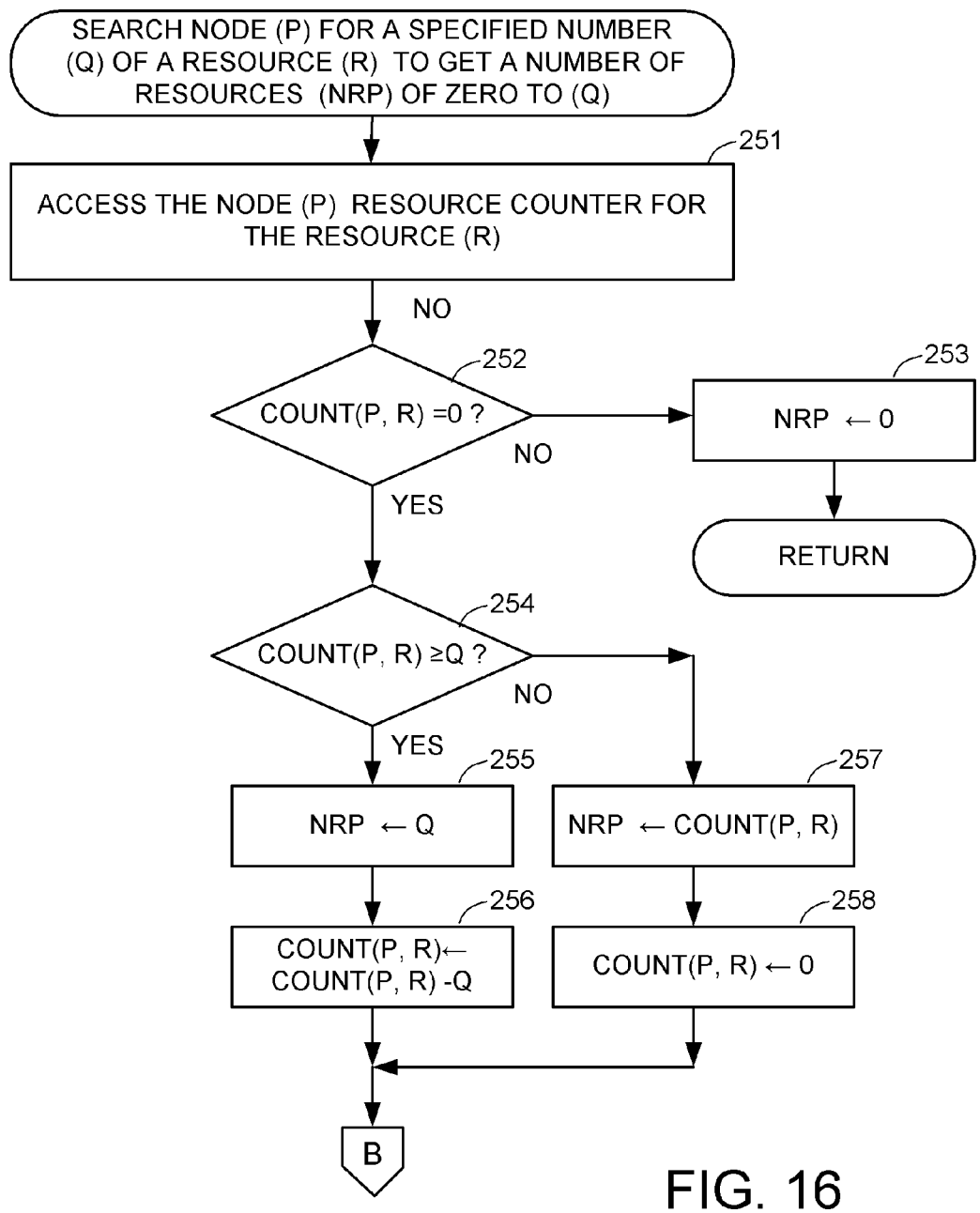
FIGS. 16 and 17 together comprise a flowchart of a preferred procedure for searching for and reserving resources at a node in the slice map hierarchy.
Figure 17:
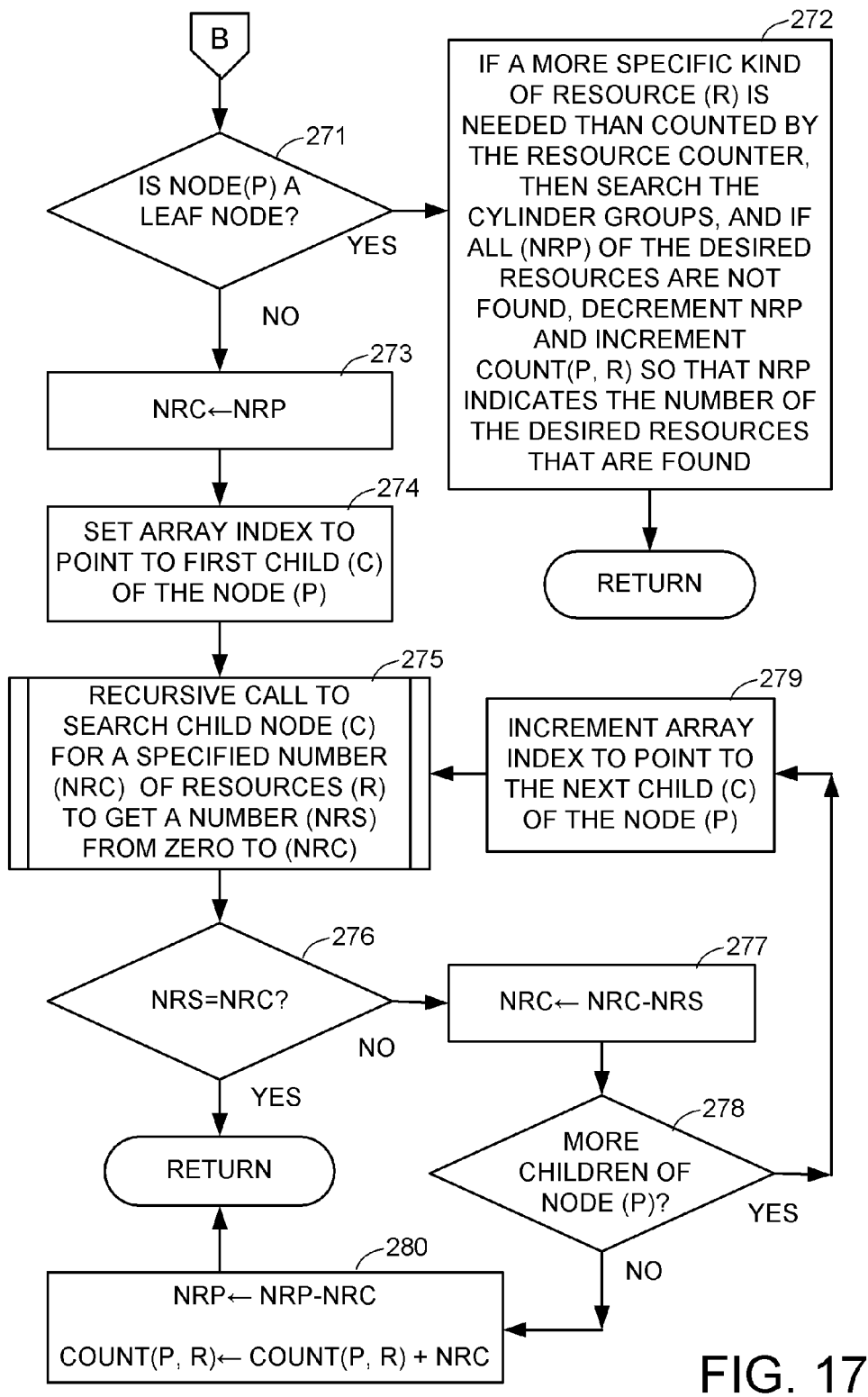

FIGS. 16 and 17 together show a flowchart of such a downward search process for pre-allocating a collection of up to (Q) free blocks or free inodes distributed over one or more slices or cylinder groups. The process finds a number (NRP) of such blocks or inodes, and the number may range from zero to (Q). Although FIGS. 16 and 17 show the pre-allocation process beginning at a specified node (P), this pre-allocation process may invoke the same pre-allocation process at a child node, so that the downward search proceeds recursively until the desired number of resources (Q) are found or until all descendants of the specified node (P) have been searched. For a top-down search through the slice map hierarchy, the procedure is invoked initially upon the root node.

In a first step 251 in FIG. 16, the node (P) resource counter for the resource (R) is accessed. In step 252, if the counter of the node (P) for the desired type of resource (R) is equal to zero, then execution branches to step 253 to set the number of pre-allocated resources (NRP) to zero, and then execution returns. Otherwise, in step 254, the counter of the node (P) for the desired type of resource (R) is compared to the desired number (Q) to determine whether it is possible to pre-allocate from one to (Q) of the desired type of resource (R). Thus, if the resource counter has at least (Q) of the desired type, then execution continues from step 254 to step 255 to set (NRP) equal to (Q) and then to step 256 to decrement the resource counter by Q in order to pre-allocate Q of the desired type of resource (R) from the resource counter. If the resource counter has less than (Q) of the desired type of resource (R), then execution branches from step 254 to step 257 to set (NRP) equal to the number that the resource counter has, and then in step 258 the resource counter is set equal to zero, so that (NRP) of the resource have been pre-allocated from the resource counter. In either case, execution continues from step 256 or 258 to step 271 in FIG. 17.

In step 271 of FIG. 17, if the node (P) is a leaf node, then execution branches to step 272. In step 272, if a more specific kind of resource (R) is needed than counted by the resource counter, then the cylinder groups in the slice are searched for the specific kind of resource that is desired. If all (NRP) of the desired resources are not found, then NRP is decremented and the counter COUNT(P, R) is incremented so that NRP indicates the number of the desired resources that are found, and then execution returns. For example, in step 272 it is found that some of a number of free blocks pre-allocated at an upper level do not have desired characteristics, such as being contiguous in a cylinder group, and in response, upon returning to the upper level, these free blocks that do not have the desired characteristics are released from the pre-allocation (by incrementing COUNT(P, R) in step 280 of FIG. 17).

In step 271, if the node (P) is not a leaf node, then execution continues to step 273. In step 273, a variable (NRC) is set equal to (NRP) to begin a search for the number of resources (NRC) in the child node of the parent node (P). In step 274 an array index is set to point to the first child (C) of the parent (P). As introduced above, this array index is called (i) for the level-1 branch nodes, (n) for level-2 branch nodes, and (m) for the leaf nodes. In step 275, the procedure of FIGS. 16 and 17 is called recursively to search the child node (C) for a specified number (NRC) of resources (R) to pre-allocate a number (NRS) from zero to (NRC). Upon return from the recursive call, in step 276, if (NRS) is equal to (NRC), then execution returns, because at this time all of the available resources (NRP) have been pre-allocated from the resource counters of one or more of the child nodes.

In step 276, if (NRS) is not equal to (NRC), then execution continues to step 277. In step 277, (NRC) is decremented by (NRS) so that (NRC) indicates the number of resources that have not yet been found and pre-allocated in the child nodes. In step 278, if there are more children of node (P), then execution branches to step 279. In step 279, the array index for the child nodes is incremented to point to the next child (C) of the node (P). Execution loops from step 279 back to step 275 to search this next child node.

In step 278, if there are no more children of node (P) to search, then execution continues from step 278 to step 280. In step 280, the number of resources found in the parent (NRP) is decremented by the number of resources not found in the children (NRC) and the count (COUNT(P, R)) of the available resources in the parent is incremented by the number of resources not found in the children (NRC). After step 280, execution returns.

The search routine in FIGS. 16 and 17 may find and pre-allocate resources located in multiple slices. However, the search routine in FIGS. 16 and 17 can be modified for more selective searching; for example, to find and pre-allocate the specified number of resources only if the specified number are found in a single node or a single slice. For example, if it is desired that all of the specified number Q of resources are found in a single slice, then step 252 of FIG. 16 is modified to compare the COUNT(P, R) to the specified number Q, and to branch to step 253 if COUNT(P, R) is less than Q, and otherwise to branch to step 255. Also, in step 277, all of the Q resources are released (by decrementing NRP by Q and incrementing COUNT(P, R) by Q) if all NRP=Q of the desired resources are not found in the leaf node.

Moreover, instead of performing step 272 in FIG. 17, it may be desirable to let the calling routine perform step 272 to determine whether or not the resources found and pre-allocated from the resource counter COUNT(P, R) of a slice have more specific properties or characteristics desired by the calling routine. Thus, a search for Q resources of a specified resource type R may return an indication that Q resources of the type R have been found and pre-allocated from an indicated slice, and the calling routine may then search the cylinder groups of the indicated slice for Q of the resources having more specific properties or characteristics in addition to the specified resource type R.

Figure 18:
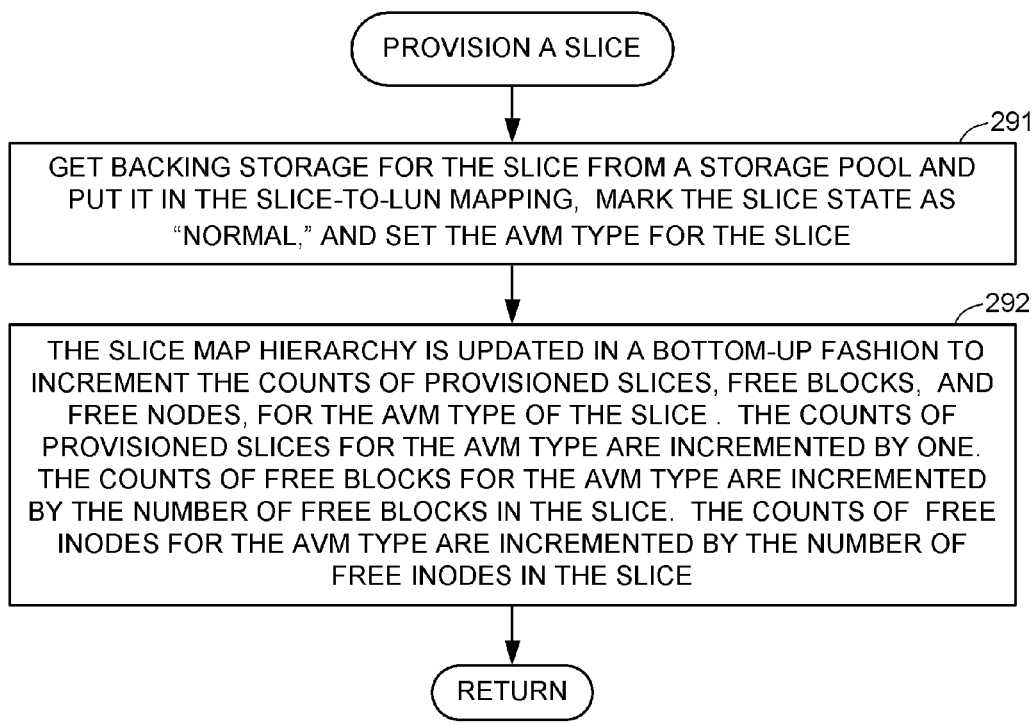
FIG. 18 is a flowchart of a procedure for provisioning a slice with backing storage.

FIG. 18 shows a procedure for provisioning a slice with backing storage. In step 291, backing storage for the slice is taken from a storage pool and put in the slice-to-LUN mapping (80 in FIG. 2) for the sparse metavolume (70 in FIG. 2). The state of the slice is marked as "normal," and the AVM type for the slice is set. In step 292, the slice map hierarchy is updated in a bottom-up fashion to increment the counts of the provisioned slices, free blocks, and free inodes, for the AVM type of the slice. The counts of the provisioned slices for the AVM type are incremented by one. The counts of free blocks for the AVM type are incremented by the number of free blocks in the slice. The counts of free inodes for the AVM type are incremented by the number of free inodes in the slice.

Figure 19:
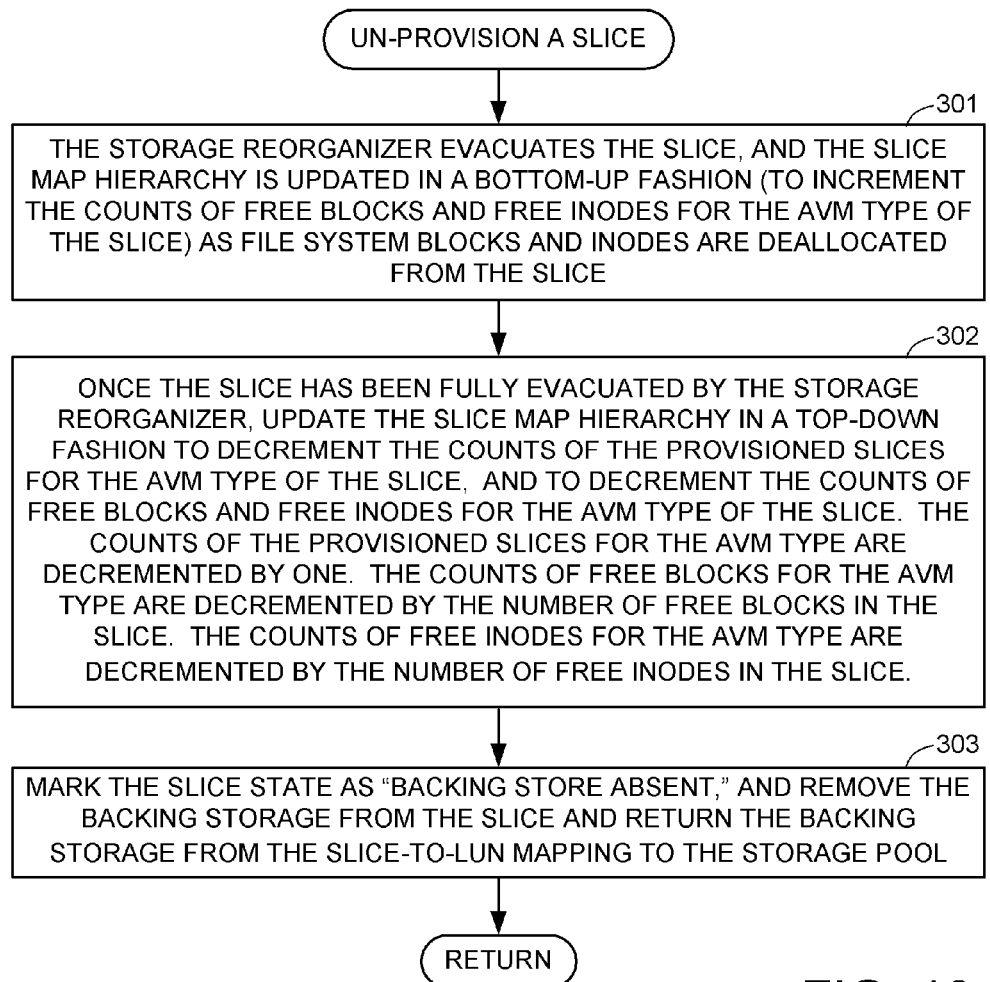
FIG. 19 is a flowchart of a procedure for un-provisioning a slice with backing storage.

FIG. 19 shows a procedure for un-provisioning a slice with backing storage. In step 301, the storage reorganizer evacuates the slice, and the slice map hierarchy is updated in a bottom-up fashion (to increment the counts of free blocks and free inodes for the AVM type of the slice) as file system blocks and inodes are deallocated from the slice. In step 302, once the slice has been fully evacuated by the storage reorganizer, the slice map hierarchy is updated in a top-down fashion to decrement the counts of the provisioned slices for the AVM type of the slice, and to decrement the counts of the free blocks and free inodes for the AVM type of the slice. The counts of provisioned slices for the AVM type are decremented by one. The counts of free blocks for the AVM type are decremented by the number of free blocks in the slice. The counts of free inodes for the AVM type are decremented by the number of free inodes in the slice. In step 303, the slice state is marked as "backing store absent," and the backing storage of the slice is removed from the slice and returned from the slice-to-LUN mapping to the storage pool.

Figure 20:
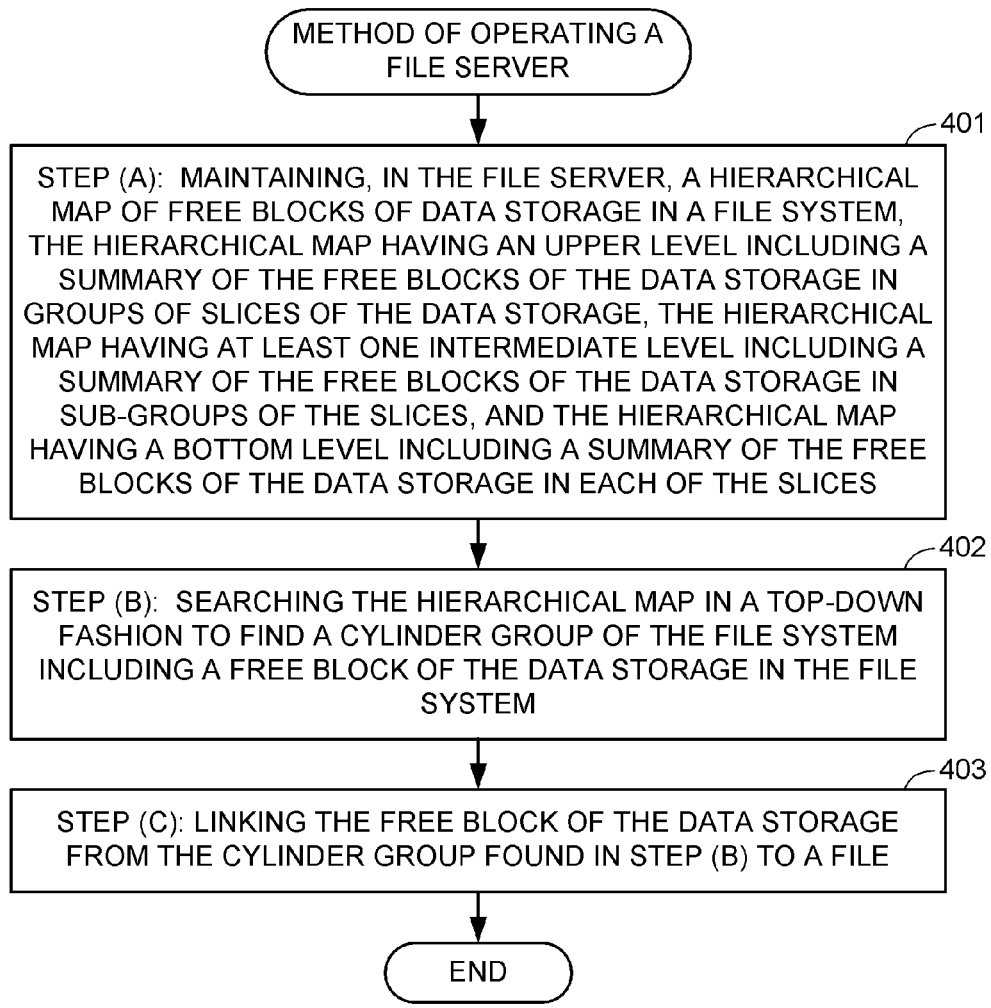
FIG. 20 is a flowchart of a method of operating the file server introduced in FIG. 1.

FIG. 20 shows a summary of the method of operating the file server (21 in FIG. 1) in the fashion described above with respect to FIGS. 14 and 15. In step 401 of FIG. 20, the file server performs a step (a) of maintaining, in the file server, a hierarchical map (105 in FIGS. 6 and 7) of free blocks of data storage in a file system. The hierarchical map has an upper level (201 in FIG. 6) including a summary of the free blocks of the data storage in groups of slices of the data storage, the hierarchical map has at least one intermediate level (202 in FIG. 6) including a summary of the free blocks of the data storage in sub-groups of the slices, and the hierarchical map has a bottom level (203 in FIG. 6) including a summary of the free blocks of the data storage in each of the slices. The maintaining of the hierarchical map was described above with reference to FIG. 15.

In step 402 of FIG. 20, the file server performs a step (b) of searching the hierarchical map in a top-down fashion to find a cylinder group of the file system including a free block of the data storage in the file system. The searching of the hierarchical map was described above with reference to steps 231 to 236 in FIG. 14. Finally, in step 403, the file server performs a step (c) of linking the free block of the data storage from the cylinder group found in step (b) to a file. The linking of the free block to a file was described above with reference to step 237 in FIG. 14.

In view of the above, there has been described a file server storing a file system built upon a sparse volume. The file system includes multiple cylinder groups. Each cylinder group includes file system blocks. The file system blocks include allocated blocks and free blocks. The sparse volume includes slices of virtual storage, and each slice stores at least one of the cylinder groups. At least one of the slices is provisioned with physical storage. The hierarchical slice map has a top level that provides a summary of free blocks over the entire file system. The hierarchical slice map has an upper level that provides a summary of the free blocks in groups of the slices. The hierarchical slice map has an intermediate level that provides a summary of the free blocks in sub-groups of the slices. The hierarchical slice map has a bottom level that includes a summary of the free blocks in each of the slices. For example, the summary for each group or sub-group of slices includes a count of the number of provisioned slices in each group or sub-group and a count of the number of free blocks and a count of the free Modes in each group or sub-group.

To find a free block for allocation to a file, the slice map hierarchy is searched in a top-down fashion. Upon provisioning or unprovisioning a slice with physical storage and upon allocating or de-allocating a block, the slice map hierarchy is updated in a bottom-up fashion. In order to search for a free block of a specified one of a plurality of types of physical storage, the summary information for each slice group or sub-group includes a count of the number of free blocks of each type of physical storage.

What is claimed is:

1. A computer-implemented method of operating a file server, the file server including data storage and a data processor, the data storage storing a logical volume and a file system built on the logical volume, the file system including multiple cylinder groups, each of the cylinder groups including file system blocks, the file system blocks including allocated blocks and free blocks of the data storage, the logical volume including slices of the data storage, and each slice of the data storage storing at least one of the cylinder groups, the method comprising the data processor executing computer instructions stored on a non-transitory computer-readable storage medium to perform the steps of:

(a) maintaining, in the file server, a hierarchical map of the free blocks of the data storage in the file system, the hierarchical map having an upper level including a summary of the free blocks of the data storage in groups of the slices, the hierarchical map having at least one intermediate level including a summary of the free blocks of the data storage in sub-groups of the slices, and the hierarchical map having a bottom level including a summary of the free blocks of the data storage in each of the slices of the data storage; and (b) searching the hierarchical map in a top-down fashion to find a cylinder group of the file system including a free block of the data storage in the file system; and (c) linking the free block of the data storage from the cylinder group found in step (b) to a file.

2. The computer-implemented method as claimed in claim 1, which further includes pre-allocating a number of the free blocks at the upper level of the hierarchical map, and then finding at a lower level of the hierarchical map that some of the number of the pre-allocated free blocks do not have desired characteristics, and in response to finding at the lower level of the hierarchical map that some of the number of the pre-allocated free blocks do not have desired characteristics, then releasing said some of the number of the pre-allocated free blocks from the pre-allocation of the number of the free blocks at the upper level.

3. The computer-implemented method as claimed in claim 1, wherein the hierarchical map includes a vector of slice group resource descriptors indicating a presence or absence of at least one free block in each of the groups of the slices, and for each of the groups of the slices, a respective vector of slice sub-group resource descriptors indicating a presence or absence of at least one free block in each of the sub-groups of the slices included in said each of the groups of the slices; and wherein step (b) of searching the hierarchical map in a top-down fashion includes scanning the vector of slice group resource descriptors until one of the slice group resource descriptors in the vector of slice group resource descriptors is found to indicate the presence of at least one free block in one of the groups of the slices, and upon finding said one of the slice group resource descriptors, then scanning the vector of slice sub-group resource descriptors indicating a presence or absence of at least one free block in each of the sub-groups of the slices included in said one of the groups of the slices; and wherein the step (a) of maintaining the hierarchical map in the file server includes updating the levels of the hierarchical map in a top-down fashion through the hierarchical map to pre-allocate free blocks in the levels of the hierarchical map before the pre-allocated blocks are allocated in the file system, and after blocks allocated in the file system are freed in the file system, updating the levels of the hierarchical map in a bottom-up fashion through the file system to add the freed blocks to the levels of the hierarchical map, so that free blocks found at an upper level of the hierarchical map will also be found at a lower level of the hierarchical map during the searching of the hierarchical map in a top-down fashion in step (b).

4. The computer-implemented method as claimed in claim 1, wherein the step (a) of maintaining the hierarchical map in the file server includes updating the levels of the hierarchical map in a bottom-up fashion upon performing step (c) of linking the free block of the data storage from the cylinder group found in step (b) to the file.

5. The computer-implemented method as claimed in claim 1, wherein the hierarchical map includes a respective count of the free file system blocks for each of the groups of the slices, a respective count of the free file system blocks for each of the sub-groups of the slices, and a respective count of the free file system blocks for each of the slices, and the step (a) of maintaining the hierarchical map in the file server includes, upon performing step (c) of linking the free block of the data storage from the cylinder group found in step (b) to the file: (1) updating the hierarchical map by decrementing a respective one of the counts for a respective one of the groups of the slices of the data storage including the free block of the data storage that was allocated to the file, and (2) updating the hierarchical map by decrementing a respective one of the counts for a respective one of the sub-groups of the slices of the data storage including the free block of the data storage that was allocated to the file, and (3) updating the hierarchical map by decrementing a respective one of the counts for a respective one of the groups of the slices of the data storage including the free block of the data storage that was allocated to the file.

6. The computer-implemented method as claimed in claim 1, wherein the logical volume includes some slices that are not provisioned with the data storage so that the logical volume is sparse, and wherein the free block linked to the file is a block in a slice that is provisioned with the data storage, and the step (a) of maintaining the hierarchical map of the free blocks in the file system includes maintaining in the hierarchical map: (1) respective counts of slices that are provisioned with the data storage in the groups of the slices, and (2) respective counts of slices that are provisioned with the data storage in the sub-groups of the slices.

7. The computer-implemented method as claimed in claim 6, wherein the step (a) of maintaining the hierarchical map of the free blocks in the file system further includes, upon provisioning a slice with data storage, updating the levels of the hierarchical map in a bottom-up fashion to increment the respective counts of slices that are provisioned with the data storage and to increment counts of free blocks of the file system.

8. The computer-implemented method as claimed in claim 6, wherein the step (a) of maintaining the hierarchical map of the free blocks in the file system further includes, upon evacuating allocated blocks from a slice provisioned with data storage, updating the levels of the hierarchical map in a bottom-up fashion to increment counts of free blocks of the file system, and once the slice provisioned with data storage has been fully evacuated, updating the levels of the hierarchical map in a top-down fashion to decrement the respective counts of slices that are provisioned with the data storage and to decrement the counts of free blocks of the file system, and removing backing storage from the slice that has been fully evacuated.

9. The computer-implemented method as claimed in claim 1, wherein:

the data storage includes a plurality of types of physical storage, and the summary information in the hierarchical map includes, for each of the groups of the slices, a count of free blocks of each type of physical storage; and the summary information in the hierarchical map includes, for each of the sub-groups of the slices, a count of free blocks of each type of physical storage; and the step (b) of searching the hierarchical map in a top-down fashion is performed in response to a request to allocate a block of a specified one of the types of physical storage, and the step (b) of searching the hierarchical map in a top-down fashion finds an indication in the hierarchical map the that one of the groups of the slices includes at least one block of the specified one of the types of physical storage, and finds an indication in the hierarchical map that one of the sub-groups of the slices includes at least one block of the specified one of the types of physical storage, in order to find a cylinder group of the file system containing a free block of the specified one of the types of physical storage so that the free block linked in step (c) to the file is stored in the specified one of the types of physical storage.

10. The computer-implemented method as claimed in claim 1, wherein:

the hierarchical map includes respective nodes for the groups of the slices, and respective nodes for the sub-groups of the slices, and there is an algebraic relationship between addresses of the nodes for the groups of the slices and addresses of the nodes of the sub-groups of the slices, and the step (b) of searching the hierarchical map in a top-down fashion to find a cylinder group of the file system including searching an upper level of the hierarchical map to find an index (i) of one of the groups of the slices having the cylinder group found in step (b), and then performing an algebraic computation upon the index (i) to compute an address of the node of said one of the sub-groups of the slices having the cylinder group found in step (b), and using the computed address of the node of said one of the sub-groups of the slices having the cylinder group found in step (b) to search the node of said one of the sub-groups of the slices having the cylinder group found in step (b).

11. A file server comprising:

data storage storing a logical volume and a file system built on the logical volume, the file system including multiple cylinder groups, each of the cylinder groups including file system blocks, the file system blocks including allocated blocks and free blocks of the data storage, the logical volume including slices of the data storage, and each slice of the data storage storing at least one of the cylinder groups, a data processor coupled to the data storage for storing data in the data storage and for reading stored data from the data storage; and a non-transitory computer readable storage medium storing computer instructions that, when executed by the data processor, perform the steps of:

(a) maintaining, in the file server, a hierarchical map of the free blocks of the data storage in the file system, the hierarchical map having an upper level including a summary of the free blocks of the data storage in groups of the slices, the hierarchical map having at least one intermediate level including a summary of the free blocks of the data storage in sub-groups of the slices, and the hierarchical map having a bottom level including a summary of the free blocks of the data storage in each of the slices of the data storage;

(b) searching the hierarchical map in a top-down fashion to find a cylinder group of the file system including a free block of the data storage in the file system; and (c) linking the free block of the data storage from the cylinder group found in step (b) to the file.

12. The file server as claimed in claim 11, wherein the computer instructions, when executed by the data processor, further perform the steps of:

pre-allocating a number of the free blocks at the upper level of the hierarchical map, and then finding at a lower level of the hierarchical map that some of the number of the pre-allocated free blocks do not have desired characteristics, and in response to finding at the lower level of the hierarchical map that some of the number of the pre-allocated free blocks do not have desired characteristics, then releasing said some of the number of the pre-allocated free blocks from the pre-allocation of the number of the free blocks at the upper level.

13. The file server as claimed in claim 12, wherein the hierarchical map includes a vector of slice group resource descriptors indicating a presence or absence of at least one free block in each of the groups of the slices, and for each of the groups of the slices, a respective vector of slice sub-group resource descriptors indicating a presence or absence of at least one free block in each of the sub-groups of the slices included in said each of the groups of the slices; and wherein step (b) of searching the hierarchical map in a top-down fashion includes scanning the vector of slice group resource descriptors until one of the slice group resource descriptors in the vector of slice group resource descriptors is found to indicate the presence of at least one free block in one of the groups of the slices, and upon finding said one of the slice group resource descriptors, then scanning the vector of slice sub-group resource descriptors indicating a presence or absence of at least one free block in each of the sub-groups of the slices included in said one of the groups of the slices; and wherein the step (a) of maintaining the hierarchical map in the file server includes updating the levels of the hierarchical map in a top-down fashion through the hierarchical map to pre-allocate free blocks in the levels of the hierarchical map before the pre-allocated blocks are allocated in the file system, and after blocks allocated in the file system are freed in the file system, updating the levels of the hierarchical map in a bottom-up fashion through the file system to add the freed blocks to the levels of the hierarchical map, so that free blocks found at an upper level of the hierarchical map will also be found at a lower level of the hierarchical map during the searching of the hierarchical map in a top-down fashion in step (b).

14. The file server as claimed in claim 11, wherein the step (a) of maintaining the hierarchical map in the file server includes updating the levels of the hierarchical map in a bottom-up fashion upon performing step (c) of linking the free block of the data storage from the cylinder group found in step (b) to the file.

15. The file server as claimed in claim 11, wherein the hierarchical map includes a respective count of the allocated or free file system blocks for each of the groups of the slices, a respective count of the allocated or free file system blocks for each of the sub-groups of the slices, and a respective count of the allocated or free file system blocks for each of the slices, and the step (a) of maintaining the hierarchical map in the file server includes, upon performing step (c) of linking the free block of the data storage from the cylinder group found in step (b) to the file: (1) updating the hierarchical map by incrementing or decrementing a respective one of the counts for a respective one of the groups of the slices of the data storage including the free block of the data storage that was allocated to the file, and (2) updating the hierarchical map by incrementing or decrementing a respective one of the counts for a respective one of the sub-groups of the slices of the data storage including the free block of the data storage that was allocated to the file, and (3) updating the hierarchical map by incrementing or decrementing a respective one of the counts for a respective one of the of the groups of the slices of the data storage including the free block of the data storage that was allocated to the file.

16. The file server as claimed in claim 11, wherein the logical volume includes some slices that are not provisioned with the data storage so that the logical volume is sparse, and wherein the free block linked to the file is a block in a slice that is provisioned with the data storage, and the step (a) of maintaining the hierarchical map of the free blocks in the file system includes maintaining in the hierarchical map: (1) respective counts of slices that are provisioned with the data storage in the groups of the slices, and (2) respective counts of slices that are provisioned with the data storage in the sub-groups of the slices.

17. The file server as claimed in claim 11, wherein:

the data storage includes a plurality of types of physical storage, and the summary information in the hierarchical map includes, for each of the groups of the slices, an indication of whether or not said each of the groups of the slices includes any blocks of each type of physical storage; and the summary information in the hierarchical map includes, for each of the sub-groups of the slices, an indication of whether or not said each of the sub-groups of the slices includes any blocks of each type of physical storage; and the step (b) of searching the hierarchical map in a top-down fashion is performed in response to a request to allocate a block of a specified one of the types of physical storage, and the step (b) of searching the hierarchical map in a top-down fashion finds an indication in the hierarchical map the that one of the groups of the slices includes at least one block of the specified one of the types of physical storage, and finds an indication in the hierarchical map that one of the sub-groups of the slices includes at least one block of the specified one of the types of physical storage, in order to find a cylinder group of the file system containing a free block of the specified one of the types of physical storage so that the free block linked in step (c) to the file is stored in the specified one of the types of physical storage.

18. The file server as claimed in claim 11, wherein:
the hierarchical map includes respective nodes for the groups of the slices, and respective nodes for the sub-groups of the slices, and there is an algebraic relationship between addresses of the nodes for the groups of the slices and addresses of the nodes of the sub-groups of the slices, and the step (b) of searching the hierarchical map in a top-down fashion to find a cylinder group of the file system including searching an upper level of the hierarchical map to find an index (i) of one of the groups of the slices having the cylinder group found in step (b), and then performing an algebraic computation upon the index (i) to compute an address of the node of said one of the sub-groups of the slices having the cylinder group found in step (b), and using the computed address of the node of said one of the sub-groups of the slices having the cylinder group found in step (b) to search the node of said one of the sub-groups of the slices having the cylinder group found in step (b).

19. A non-transitory computer-readable storage medium containing instructions that, when executed by a data processor of a file server, perform the steps of:
(a) maintaining, in the file server, a hierarchical map of free blocks of data storage in a file system built upon a volume of slices of the data storage, each of the slices of the data storage containing at least one cylinder group of the file system, the hierarchical map having an upper level including a summary of the free blocks of the data storage in groups of the slices, the hierarchical map having at least one intermediate level including a summary of the free blocks of the data storage in sub-groups of the slices, and the hierarchical map having a bottom level including a summary of the free blocks of the data storage in each of the slices of the data storage; and
(b) searching the hierarchical map in a top-down fashion to find a cylinder group of the file system including a free block of the data storage in the file system; and
(c) linking the free block of the data storage from the cylinder group found in step (b) to a file.

20. The non-transitory computer-readable storage medium as claimed in claim 19, wherein the instructions, when executed by a data processor of a file server, further perform the steps of:
pre-allocating a number of the free blocks at the upper level of the hierarchical map, and then finding at a lower level of the hierarchical map that some of the number of the pre-allocated free blocks do not have desired characteristics, and in response to finding at the lower level of the hierarchical map that some of the number of the pre-allocated free blocks do not have desired characteristics, then releasing said some of the number of the pre-allocated free blocks from the pre-allocation of the number of the free blocks at the upper level.

\* \* \* \* \*